United States Patent
Faulkner et al.

(10) Patent No.: US 11,080,941 B2
(45) Date of Patent: Aug. 3, 2021

(54) INTELLIGENT MANAGEMENT OF CONTENT RELATED TO OBJECTS DISPLAYED WITHIN COMMUNICATION SESSIONS

(71) Applicant: MICROSOFT TECHNOLOGY LICENSING, LLC, Redmond, WA (US)

(72) Inventors: Jason Thomas Faulkner, Seattle, WA (US); Sandhya Rao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/228,638

(22) Filed: Dec. 20, 2018

(65) Prior Publication Data
US 2020/0202634 A1 Jun. 25, 2020

(51) Int. Cl.
*G06T 19/20* (2011.01)
*G06F 21/60* (2013.01)
(Continued)

(52) U.S. Cl.
CPC ............ *G06T 19/20* (2013.01); *G06F 21/604* (2013.01); *G06T 19/006* (2013.01); *H04L 65/1066* (2013.01); *H04L 12/1813* (2013.01)

(58) Field of Classification Search
CPC ..... G06T 19/20; G06T 19/006; G06F 21/604; H04L 65/1066
(Continued)

(56) References Cited

U.S. PATENT DOCUMENTS 6,335,731 B1 * 1/2002 Yamamoto ............. A63F 13/10
345/420
2006/0136552 A1 6/2006 Krane et al.
(Continued)

FOREIGN PATENT DOCUMENTS

| EP | 2977961 A1 | 1/2016 |
| WO | 2017027183 A1 | 2/2017 |

OTHER PUBLICATIONS

"Non Final Office Action Issued in U.S. Appl. No. 15/993,519", dated Aug. 5, 2019, 25 Pages.
(Continued)

*Primary Examiner* — Jin Ge
(74) *Attorney, Agent, or Firm* — Newport IP, LLC; Scott Y. Shigeta

(57) ABSTRACT

The techniques disclosed herein improve the efficiency of a system by providing intelligent management of content that is associated with objects displayed within communication sessions. The participants can generate a content object associated with a 3D object. The content object may be in the form of 3D virtual object such as an arrow pointing to the table, a text box of an annotation, etc. The content object may also include functional features that collect and display information voting agent. The system can generate a data structure that associates the object with the content object. The data structure enables a system to maintain an association between the object and the content object when various operations are applied to either object. Thus, if a remote computer sends a request for the content object, the associated object is delivered with the content object.

20 Claims, 17 Drawing Sheets

(51) Int. Cl.
  *G06T 19/00* (2011.01)
  *H04L 29/06* (2006.01)
  *H04L 12/18* (2006.01)
(58) Field of Classification Search
  USPC ........................................................ 345/419
  See application file for complete search history.

(56) References Cited

U.S. PATENT DOCUMENTS

| | | | |
|---|---|---|---|
| 2009/0089322 A1* | 4/2009 | Naaman | G06F 16/48 |
| 2009/0195656 A1 | 8/2009 | Zhou et al. | |
| 2011/0285811 A1 | 11/2011 | Langlotz et al. | |
| 2012/0072420 A1* | 3/2012 | Moganti | G06F 16/748 |
| | | | 707/737 |
| 2012/0143361 A1* | 6/2012 | Kurabayashi | G06T 19/006 |
| | | | 700/94 |
| 2014/0002444 A1* | 1/2014 | Bennett | G06F 3/0304 |
| | | | 345/419 |
| 2014/0006967 A1 | 1/2014 | Arumugam et al. | |
| 2014/0306993 A1 | 10/2014 | Poulos et al. | |
| 2015/0067615 A1 | 3/2015 | Sim et al. | |
| 2015/0254905 A1 | 9/2015 | Ramsby et al. | |
| 2016/0246948 A1* | 8/2016 | Xiao | G06F 21/10 |
| 2016/0379409 A1* | 12/2016 | Gavriliuc | G06F 3/011 |
| | | | 345/8 |
| 2017/0039770 A1* | 2/2017 | Lanier | G06T 19/006 |
| 2017/0061691 A1 | 3/2017 | Scott et al. | |
| 2018/0121214 A1 | 5/2018 | Faulkner et al. | |
| 2019/0236842 A1* | 8/2019 | Bennett | G06Q 10/00 |
| 2019/0318510 A1* | 10/2019 | Eronen | G06T 11/001 |
| 2019/0369836 A1 | 12/2019 | Faulkner et al. | |

OTHER PUBLICATIONS

"International Search Report and Written Opinion Issued in PCT Application No. PCT/US19/031926", dated Jul. 24, 2019, 12 Pages.
"International Search Report and Written Opinion Issued in PCT Application No. PCT/US19/065572", dated Mar. 4, 2020, 12 Pages.
"Final Office Action Issued in U.S. Appl. No. 15/993,519", dated Feb. 10, 2020, 25 Pages.

* cited by examiner

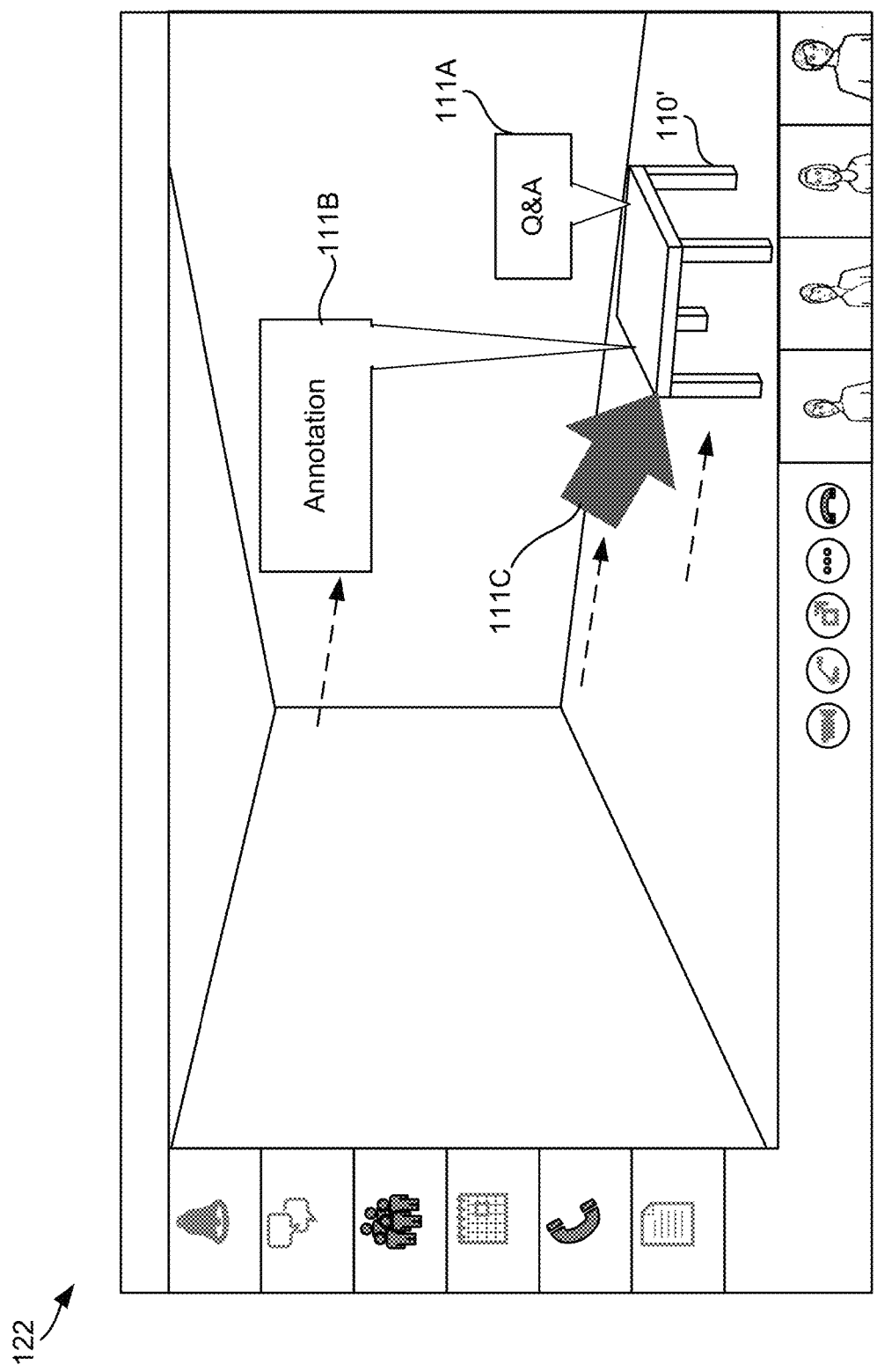

Data Structure 501"

Association Data 503"

Position of each Virtual Object, Position of each Real World Object, and Position of each Content Object Relative position of each Content Object User Permissions: User 1=read and write to object and content object, User 2=read only, Group 1 Access: none

Model Data 505"

Virtual Objects: Dimensions, Position, Textures, etc.

Real World Objects: Dimensions, colors, textures and Images

Content Data 507"

User Interface Layouts, Format for the poll description, Chart Format, User Participation Permissions

*FIG. 5B*

INTELLIGENT MANAGEMENT OF CONTENT RELATED TO OBJECTS DISPLAYED WITHIN COMMUNICATION SESSIONS

BACKGROUND

There are a number of platforms that provide virtual reality ("VR") and mixed reality ("MR") environments. Users can create, edit, and share two-dimensional (2D) and three-dimensional (3D) objects in a collaborative environment facilitated by a communication session. Although some existing applications provide users with a number of features for creating and sharing multi-dimensional objects, some existing systems have a number of drawbacks. For instance, when a group of users create objects within a particular communication session, e.g., a private chat, a meeting or a broadcast, it may be difficult for users to share those objects with users participating in other communication sessions.

For instance, when a participant of one communication session wishes to a share 3D object and content related to the 3D object with users of another communication session, the participant is often required to save a particular version of the object and the related content and take a number of manual steps to share the object and the related content with other users. This manual process of managing an object and the related content can be time consuming and inefficient when it comes to computing resources, e.g., memory resources, processing resources, network resources, etc.

For illustrative purposes, consider a scenario where participants of one communication session, such as a group editing session, wish to share a 3D object and annotations related to the 3D object with users of a private chat session. To facilitate such a transfer, a user may be required to create a file for the object and a file for the related annotations. The user may then be required to share both files with another communication session. This process causes inefficiencies with respect to computing resources as users are required to retrieve, re-create, and transfer multiple files each time they transmit data between different types of communication sessions.

These shortcomings of existing systems can become more complicated as users increase the number of content objects that are related to 2D or 3D object. For instance, if a user adds an annotation and a virtual drawing object to a 3D object, the user must perform a number of manual steps to share the 3D object and the associated content with users of different communication sessions, which may be operating on different types of platforms. When there is a large number of content objects, the management of those content objects can become a challenge from a logistical standpoint. A user must perform a number of manual steps to even manage the files that define the content objects and the associated 3D object.

SUMMARY

The techniques disclosed herein improve the efficiency of a system by providing intelligent management of content that is associated with objects displayed within communication sessions. For instance, consider a scenario where participants of a communication session are viewing a three-dimensional (3D) object, such as a table in a room. The participants can generate a content object associated with the 3D object. The content object may be in the form of 3D virtual object such as an arrow pointing to the table, a text box comprising an annotation related to the table, etc. The content object may also include functional features that collect and display information, such as a question-and-answer (Q&A) object, a voting poll object, etc. To streamline operations that manage the content object, the system generates a data structure that associates the object (e.g., the 3D table in a 3D environment) with the content object (e.g., a virtual arrow pointing to the table). The data structure enables a system to maintain a graphical association between the object and the content object in response to a user interaction with either the object or the content object. The data structure also enables a system to automatically share the object and the associated content object with computing devices of remote communication sessions in response to one or more predetermined events. Permissions defined in the data structure can control a user's ability to move, edit, or communicate the object or the content object.

In one illustrative example, a system can provide a view of a virtual object or a real-world object in a mixed reality environment. The user can position a content object in association with the virtual object or the real-world object (both of which are collectively referred to herein as an "object"). The content object can be in the form of notes, messages, data collection agents, annotations, arrows or any other data or operations that can be rendered and utilized in association with a selected object. The system can generate a data structure defining an association between the object and the content object. In some embodiments, the object is defined as a "parent object" and the content object is defined as a "child object." The data structure can define three-dimensional coordinates for the parent object and for the child object. The data structure may also define relative positions between the parent object in the child object, e.g., that the parent object is below, above, or beside the child object. The data structure can also define functions that can be used for displaying and collecting information, such as a Q&A or voting poll.

The system can detect one or more predetermined events. For instance, when a user provides a gesture indicating a desire to move the parent object within a display environment, the system can move the parent object and the child object in a coordinated manner to maintain the graphical association between the two items. In addition, the system can communicate the parent object and the child object to remote communication sessions based on one or more events. In one illustrative example, a system monitors a number of remote communication sessions and determines when a particular communication session references the parent object or child object. For instance, participants engaging in a private chat may reference a particular parent object, such as a table that was the subject of a MS Teams meeting. In response to the reference, the system may automatically retrieve the data structure to share and display the parent object and the child object with computing devices of the private chat session without the need for manual tasks for retrieving the parent object or child object from the originating communication session. A data structure defining the parent object, the child object, and related permissions can be used to control the communication of the data structure as well as control whether the parent object or child object can be displayed, edited, or accessed by certain users of the remote communication session.

The techniques disclosed herein provide a number of features that improve existing computers. For instance, computing resources such as processor cycles, memory, network bandwidth, and power, are used more efficiently as users transition between different sessions. Data or content does not need to be re-created for users to share and display content between sessions. In addition, the recommendations enable users to make more efficient decisions by providing automatically generated visualizations of a recommendation or automatically generated resource recommendations for individual objects. The techniques disclosed herein also improve user interaction with various types of computing devices. Improvement of user interaction, or the reduction of a need for user input, can mitigate inadvertent inputs, redundant inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, networked appliances, and other devices.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3B illustrates a result of a movement operation that is applied to the parent object associated with a number of child objects.

FIG. 5B is a block diagram illustrating another embodiment of the data structure defining a content object in the form of a voting poll object.

DETAILED DESCRIPTION

Figure 1:
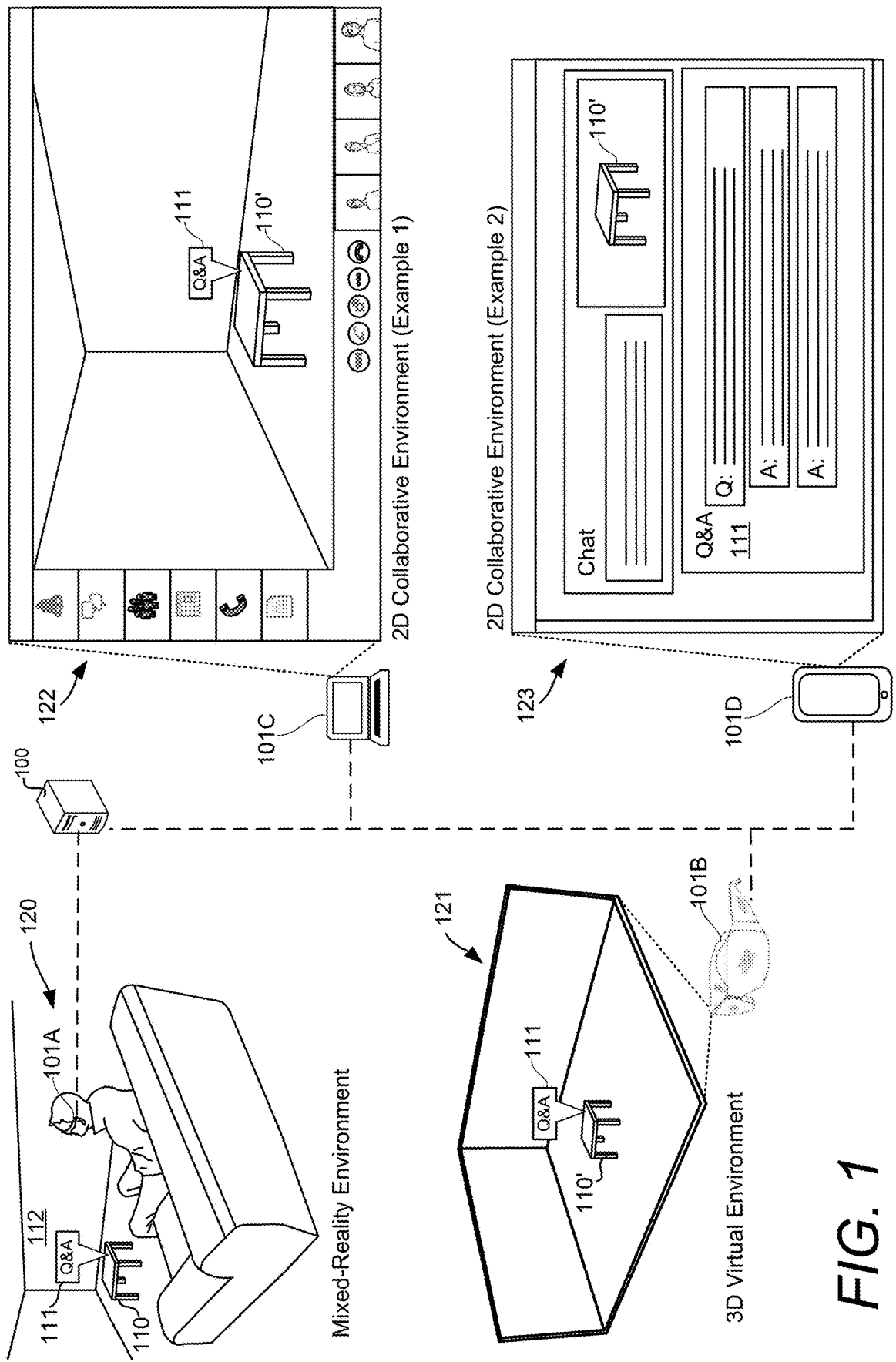
FIG. 1 illustrates an example scenario involving a system 100 that can be utilized to implement the techniques disclosed herein.

FIG. 1 illustrates an example scenario involving a system 100 that can be utilized to implement the techniques disclosed herein. The system 100 can be configured to provide a collaborative environment that facilitate the communication between two or more computing devices. A system providing a collaborative environment can allow participants to exchange live video, live audio, and other forms of data within a communication session. A collaborative environment can be in any suitable communication session format including but not limited to private chat sessions, multi-user editing sessions, group meetings, broadcasts, etc.

The system 100 can facilitate a communication session between any suitable number of computing devices. In this example, the system 100 facilitates a communication session between a first computing device 101A, a second computing device 101B, a third computing device 101C, and a fourth computing device 101D. The computing devices can be in any form such as a laptop, desktop, tablet, phone, a virtual reality head-mounted device, or a mixed-reality device.

In the example shown in FIG. 1, the first computing device 101A is a mixed-reality device that displays a provides an augmented view 120. The augmented view 120 includes a view of a real-world object 110 (also referred to herein as a "physical object") in a real-world environment 112. The augmented view 120 can also display computer-generated objects that are displayed concurrently with a view of the real-world environment 112 to augment one or more real-world objects 110.

In some embodiments, the computer-generated object can be superimposed over a real-world view by the use of a prism that provides a user with a direct line-of-sight view of the real-world object 110 and the real-world environment 112. Thus, the user can physically see the real-world object 110 and the real-world environment 112 through the prism. The prism allows the user to see natural light reflecting from the real-world object 110 and the real-world environment 112, while also allowing the user to see light that is generated from a display device for rendering a computer-generated object. By directing light from both a real-world object 110 and light from a device for rendering a computer-generated object toward a user's eyes, the prism allows a system to augment aspects of a real-world view by providing coordinated displays of computer-generated objects. Although prisms are utilized in this example, it can be appreciated that other optical devices can be utilized to generate an augmented view 120. For instance, in one alternative embodiment, a mixed reality device can capture an image of the real-world object 110 and the real-world environment 112 and display that image on a display screen with the computer-generated objects that can augment the image of the real-world object 110.

In some embodiments, the first computing device 101A utilizes an imaging device, such as a camera, to capture an image of the real-world object 110 and the real-world environment 112. The first computing device 101A can also include sensors for generating model data defining a three-dimensional (3D) model of the real-world object and the real-world environment 112. The model data and the image can be shared with other computing devices to generate a 3D rendering or a 2D rendering of the real-world object 110 and the real-world environment 112.

The second computing device 101B is a virtual reality device that can display a 3D virtual environment 121 to a user. In this example, the virtual reality device displays a 3D rendering of the object 110' within a rendering of the real-world environment 112. Model data and image data communicated from the first computing device 101A can define aspects of the real-world object 110 and the real-world environment 112 to generate a rendering of the object 110' (also described herein as a "rendering 110'."

The third computing device 101C is in the form of a desktop computer that can display a 2D perspective of a collaborative environment. In this example, the 2D perspective is in the form of a virtual meeting user interface 122. The desktop computer displays a 2D rendering of the object 110' and the real-world environment 112 within the virtual user interface 122 by the use of the model data and image data communicated from the first computing device 101A.

The fourth computing device 101D is in the form of a mobile device that can display a 2D perspective of the collaborative environment. In this example, the 2D perspective is in the form of a private chat user interface 123. The mobile device displays a 2D rendering of the object 110' within the private chat user interface 123 by the use of the model data and image data communicated from the first computing device 101A.

To illustrate aspects of the present disclosure, consider a scenario where a user provides an input at the first computing device 101A that causes the generation of a content object 111 to be positioned within the real-world environment 112. In some embodiments, the content object 111 positioned in association with the real-world object 110 (the "object 110"). For example, the content object 111 can be positioned above, beside, or below the object 110. In this specific example, the content object 111 is positioned above the object 110, which in this example, is a table. The content object 111 is specifically associated with the right corner of the top surface of the table.

In some embodiments, the position of the object 110 and the content object 111 can be defined by a coordinate system. Coordinate data for the object 110 can be derived from the depth map data captured by a sensor of the first computing device 101A. Coordinate data for the content object 111 can be derived from an input gesture of a user placing the content object 111 within rendering a view of an environment. A "relative position" can be defined by an offset that is generated from the difference of the coordinate position of one object and the coordinate position of another object, such as a content object 111. The offset may be defined by 3D coordinates, e.g., that a content object is offset by (X=−5.0, Y=10, Z=−30) from an object positioned at location (X=−500, Y=103, Z=100).

The content object 111 can be in any form. For example, the content object 111 may be in the form of 3D virtual object such as an arrow pointing to the table, a text box comprising an annotation related to the table, etc. The content object 111 can include any type of data including, video data, audio data, animated graphics, images, etc. The content object may also include functional features that display and collect information, such as a question and answer (Q&A) object, a voting poll object, etc. In the example of FIG. 1, the content object 111 is in the form of a question-and-answer ("Q&A") object that is positioned in association with the object 110, e.g., the table. The content object 111 can also include an animate object, an inanimate object, e.g., a live video feed of a person or a live video feed of a computer-generated avatar. Similarly, the object 110 can also be in any form. The object 110 can include a virtual object with functionality or the object 110 can be a passive object with no functionality. Thus, both the object 110 and the content object 111 can have similar forms, e.g., both can be Q&A objects, with one deemed as the parent object and the other deemed as the child object. The object 110 and the content object 111 can be rendered in 2D or 3D formats.

As will be described in more detail below, the Q&A object is configured to display one or more inquiries and to allow participants to provide responses to the inquiries. The Q&A object configured to display the inquiries and collect responses from users. The Q&A object can also be configured to selectively display the responses to participants of the communication session having appropriate permissions defined in the data structure.

When the content object 111 is placed in association with an object, the system generates a data structure defining the association between the object and the content object. In some embodiments, the object can be defined as a "parent object" and the content object can be defined as a "child object." In some embodiments, a system can allowed to have multiple child objects associated with a single parent object. The parent object and the child objects may be associate with an identifier to assist a computing device to keep track of each associated item. The data structure can define coordinates for the parent object and for the child object as well as other association data defining relative positions between a parent object and associated child objects. The data structure is configured to cause a computing device to maintain a graphical association between the parent object and the child object. Thus, when the object (e.g., the table) is moved or deleted, the associated content object (e.g., the Q&A) is repositioned or deleted to maintain a consistent visual association with the moved or deleted object. When the content object is moved or deleted, the associated object is repositioned or deleted to maintain a consistent visual association with the moved or deleted content object.

The data structure can cause other computing devices to display a rendering of the content object 111. For instance, an input provided at the first computing device 101A can cause the creation of the data structure defining the content object 111. The data structure can cause second computing device 101B to generate and display a rendering of the content object 111 within a virtual environment. The data structure can cause the third computing device 101C to generate and display a rendering a rendering of the content object 111 within a two-dimensional meeting environment (e.g., 122), and the data structure can cause the fourth computing device 101D to generate and display a rendering of the content object 111 within other user interface formats such as a chat user interface 123.

The data structure enables systems to maintain a relationship between parent objects and child objects during a number of actions that may be taken with respect to each object. For example, a system may analyze an input indicating an operation to be applied to the content object or the object. In response to detecting that the operation is to be applied to the content object, the system may apply the operation to the content object and replicate the operation to the object based on the association defined in the data structure. For example, if a user input indicates that a user desires to communicate the content object (e.g., the Q&A) to a remote communication session, the system will communicate the content object to the remote communication session. In addition, based on permissions defined in the data structure, the system will selectively communicate the object to the remote communication session.

Similar operations may also occur when a user applies an operation to an object (e.g., the table). The system may analyze an input indicating an operation to be applied to the content object or the object. In response to detecting that the operation is to be applied to the object, the system may apply the operation to the object and replicate the operation to the content object based on the association defined in the data structure. For example, if the user input indicates that the user desires to communicate the object (e.g., the table) to a remote communication session, the system will communicate the object to the remote communication session. In addition, based on permissions defined in the data structure, the system will selectively communicate the content object to the remote communication session.

The data structure can be used to influence a number of operations that are applied to a parent object or a child object. In some embodiments, operations that can be applied to an object or a content object include, but are not limited to, a graphical movement of an object and a communication of an object. FIG. 2 through FIG. 4 illustrative examples of a "graphical movement" of an object and FIG. 6 through FIG. 9 illustrate examples of a communication of an object.

FIG. 2A through FIG. 2D illustrate an example of how a content object may be moved in response to a movement of an object, which is in the form of a real-world object. FIG. 3A through 3B illustrate an example of how an image of the real-world object may be moved in response to a movement of the content object.

Figure 2A:
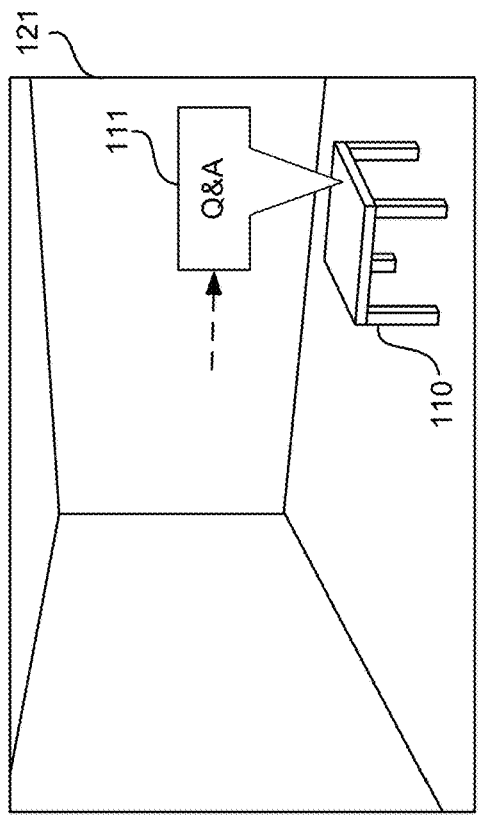
FIG. 2A illustrates a process involving an input for moving an object.
Figure 2B:
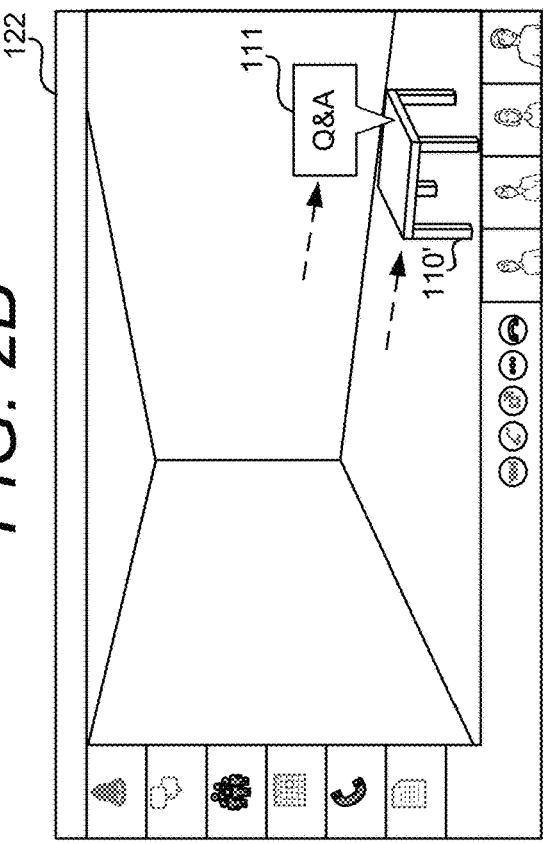
FIG. 2B illustrates a process involving the movement of a content object in response to the input applied to the object.
Figure 3A:
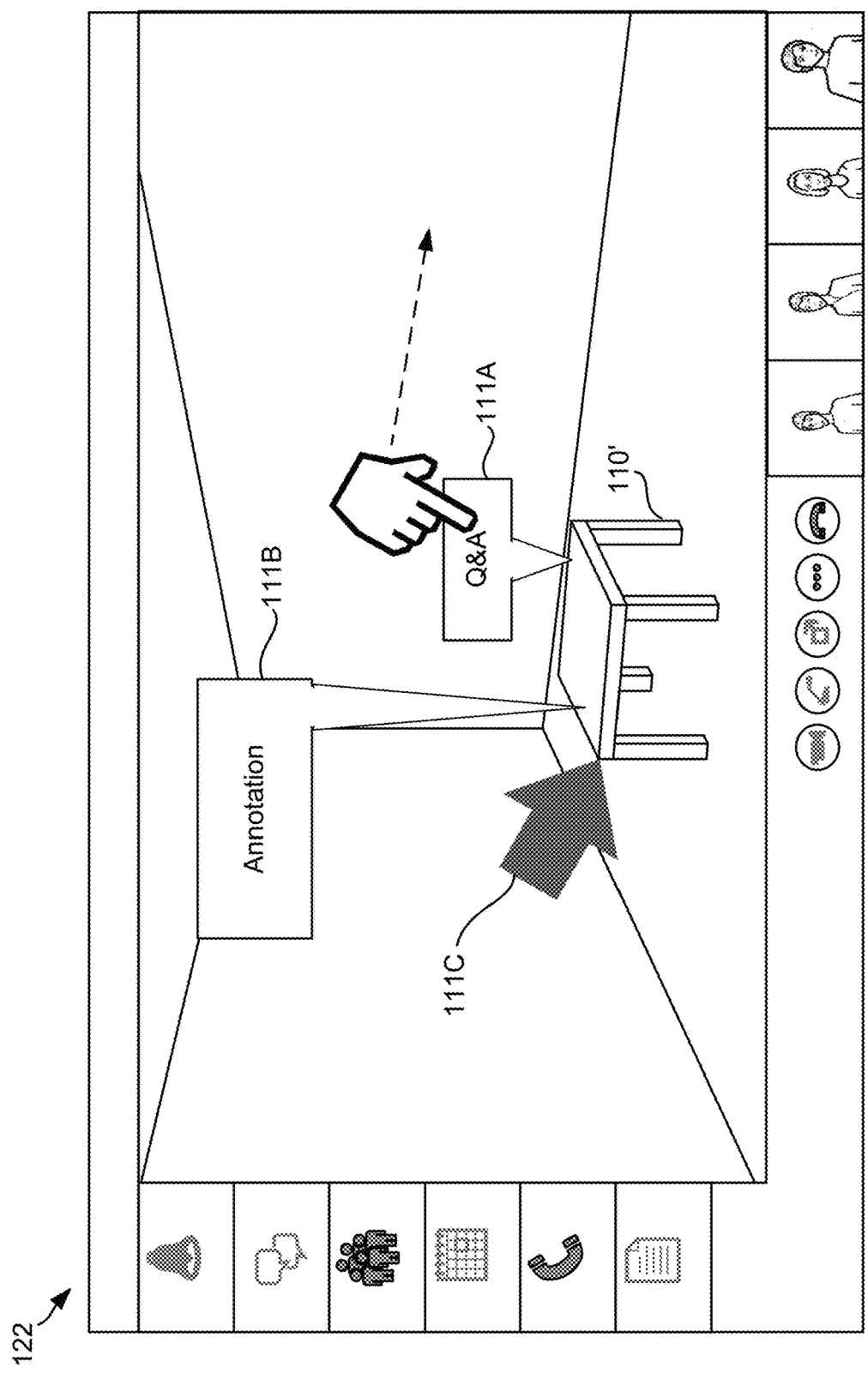
FIG. 3A illustrates an example of a parent object associated with a number of child objects.

FIG. 2A and FIG. 2B show a perspective from the first computing device 101A displaying a view of the real-world environment 112. In FIG. 2A and FIG. 2B, the real-world object 110, e.g., the table, is physically moved in the direction of the arrow from a first position to a second position. In this example, the table is physically moved within the room 112 and the sensors of the first computing device 101A track the movement.

As shown in FIG. 2B, in response to detecting the movement of the table, the first computing device 101A moves the content object 111 to maintain the relative position between the content object 111 and the real-world object 110. While the real-world object 110 is in motion, the content object 111 is moved to track the movement of the real-world object 110, and the movement maintains the graphical association defined in the data structure. As described below, sensor data of the first computing device 101A or other sensors can be used to detect the movement of a physical object, such as the table. Although this example involves the use of a head mounted display, any computing device receiving the sensor data can control the movement of the content object 111.

Figure 2C:
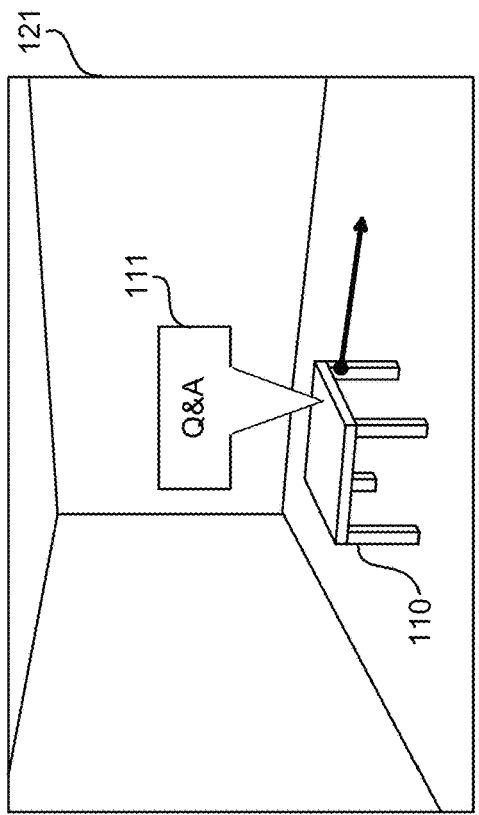
FIG. 2C illustrates a process involving the movement of the content object and a rendering of an object.
Figure 2D:
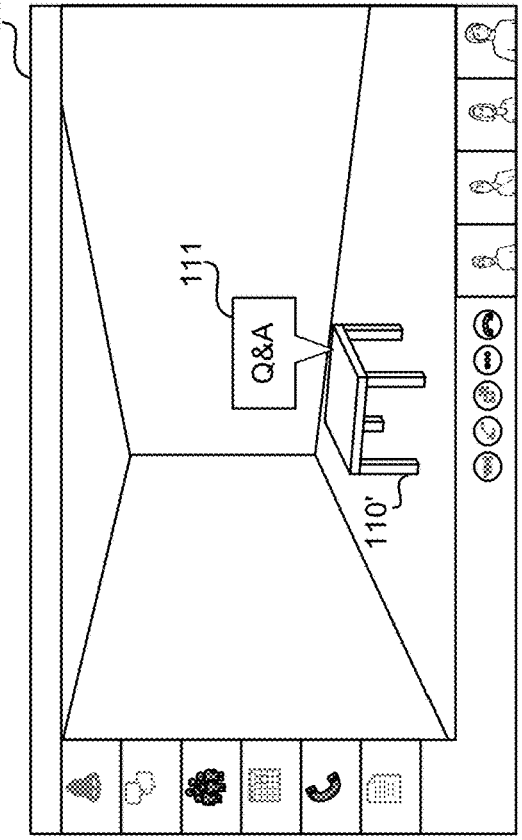
FIG. 2D illustrates a result of a movement of the content object and a rendering of an object.

A computing device utilizing the data structure can maintain the graphical association between the content object 111 and the real-world object 110 in a similar manner. For example, FIG. 2C and FIG. 2D show the movement of the real-world object 110 and the content object 111 from the perspective of the third computing device 101C displaying the virtual meeting user interface 122. FIG. 2C shows a rendering of the real-world object 110 and the content object 111 in the original positions. FIG. 2D shows the rendering of the real-world object 110 and the content object 111 during or after the movement of the real-world object 110. As the real-world object 110 is moved, the position of the content object 111 tracks the position of the real-world object 110.

Although the example described above involves an example where the parent object is an actual real-world object, can be appreciated that the parent object can also involve a virtual object. Thus, in the example shown in FIG. 2A and FIG. 2B, the object 110 can actually be a virtual object rendered within the view 121, and an association between the content object 111 and the virtual object can be stored within a data structure. Thus, in this example, a user input, such as an input gesture, can be utilized to move the object 110, and in response to such an input, the content object 111 can be moved to maintain the graphical association between the two objects.

FIGS. 3A and 3B illustrate an example of an object 110 that is associated with multiple content objects 111. In this example, the object 110 (displayed as a rendering of the object 110') is associated with a first content object 111A (Q&A), a second content object 111B (Annotation), and a third content object 111C (Arrow). In such a scenario, a data structure associating each content object (111A-111C) with the object 110 would be generated. This example is illustrated from the perspective of the third computing device 101C displaying the virtual meeting user interface 122.

In this example, a user input indicates a selection of the first content object 111A. The user input also provides an indication of a new position for the first content object 111A. In response to receiving the user input indicating a new position for the first content object 111A, a rendering of the object 110' is moved to maintain the graphical association between the first content object 111A and the rendering of the object 110'. In addition, given the association with the other content objects (111B-111C), the system also moves the other content objects (111B-111C) to maintain a graphical association defined in the data structure. As shown in FIG. 3B, the rendering of the object 110' is repositioned to maintain a relative position with respect to the first content object 111A. In addition, the second content object 111B and the third content object 111C are repositioned to maintain the same relative position with respect to the rendering of the object 110'.

Figure 4A:
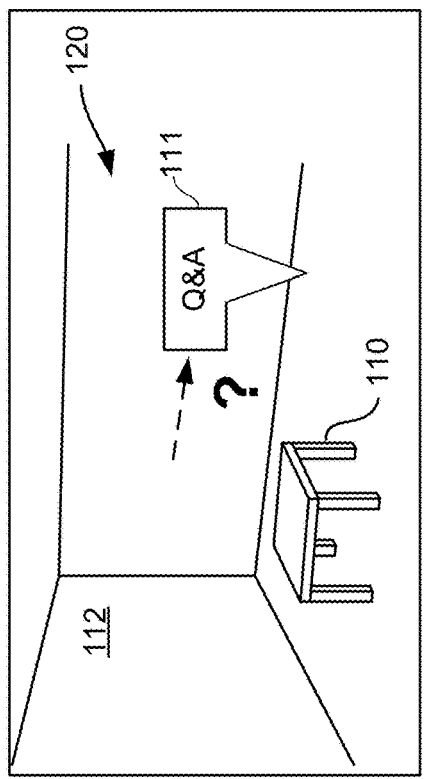
FIG. 4A illustrates starting position of a real-world object and a content object.
Figure 4B:
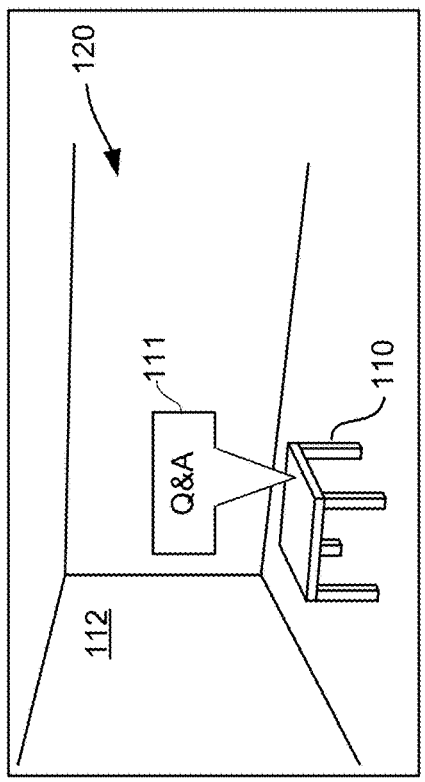
FIG. 4B illustrates a result of an input that is applied to a content object associated with a real-world object.
Figure 4C:
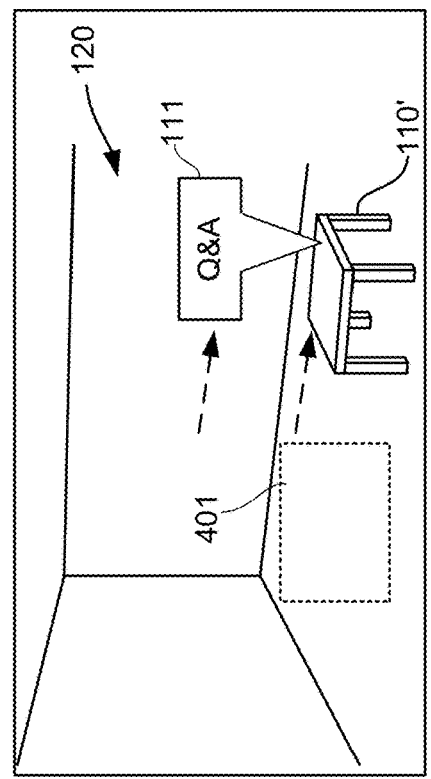
FIG. 4C illustrates a rendering of a real-world object displayed in conjunction with a content object.

FIG. 4A through FIG. 4D illustrate techniques that resolve visual conflicts that may occur from a direct view of an object 110 provided by a mixed reality device. Specifically, FIGS. 4A and 4B illustrate a visual conflict that may arise when a mixed-reality device that provides a direct view of the object 110 in the real-world environment 112. In this example, a user input is provided to move the content object 111. As described above, such an input can cause a computer to move a rendering of the object 110 that is associated with the content object 111. Such a feature works well with 3D virtual environments 121, virtual meeting user interfaces 122, and the private chat user interfaces 123, where a computer displays a rendering of the real-world object 110. However, as shown in the transition between FIG. 4A and FIG. 4B, when a mixed-reality device provides a direct view of the object 110, the mixed-reality device cannot move the real-world object 110 viewed within the real-world environment 112.

Figure 4D:
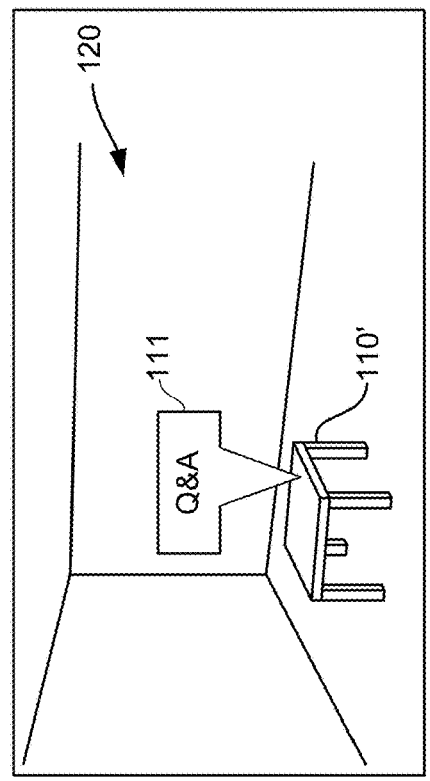
FIG. 4D illustrates movement of the rendering of the real-world object in response to a movement man applied to an associated content object.

To give the user of the mixed-reality device the same experience as users of other types of computing devices, some embodiments disclosed herein can generate a rendering of the object 110' (also referred to herein as the rendering 110') that functions as an overlay over the real-world object 110. In the example shown in FIG. 4C, a rendering of the object 110' is generated and placed over the direct view of the actual real-world object 110. The position of the rendering 110' can also be coordinated with the position of the content object 111. Thus, when an input is received that causes the real-world object 110 to be moved, the mixed reality device can move the rendering 110' to maintain the association with the content object 111. In some embodiments, as shown in FIG. 4D, the mixed reality device can also render a graphical element 401 to obscure the direct view of the object 110. The graphical element 401 can be optional as it may be desirable for system to provide a view of the real-world object 110 concurrently with a rendering of the real-world object 110'. In such an embodiment, one or more graphical effects may be applied to the view of the real-world object 110 or the rendering of the real-world object 110' such as a dimming effect to help a user distinguish the physical object from the rendered object.

Figure 5A:
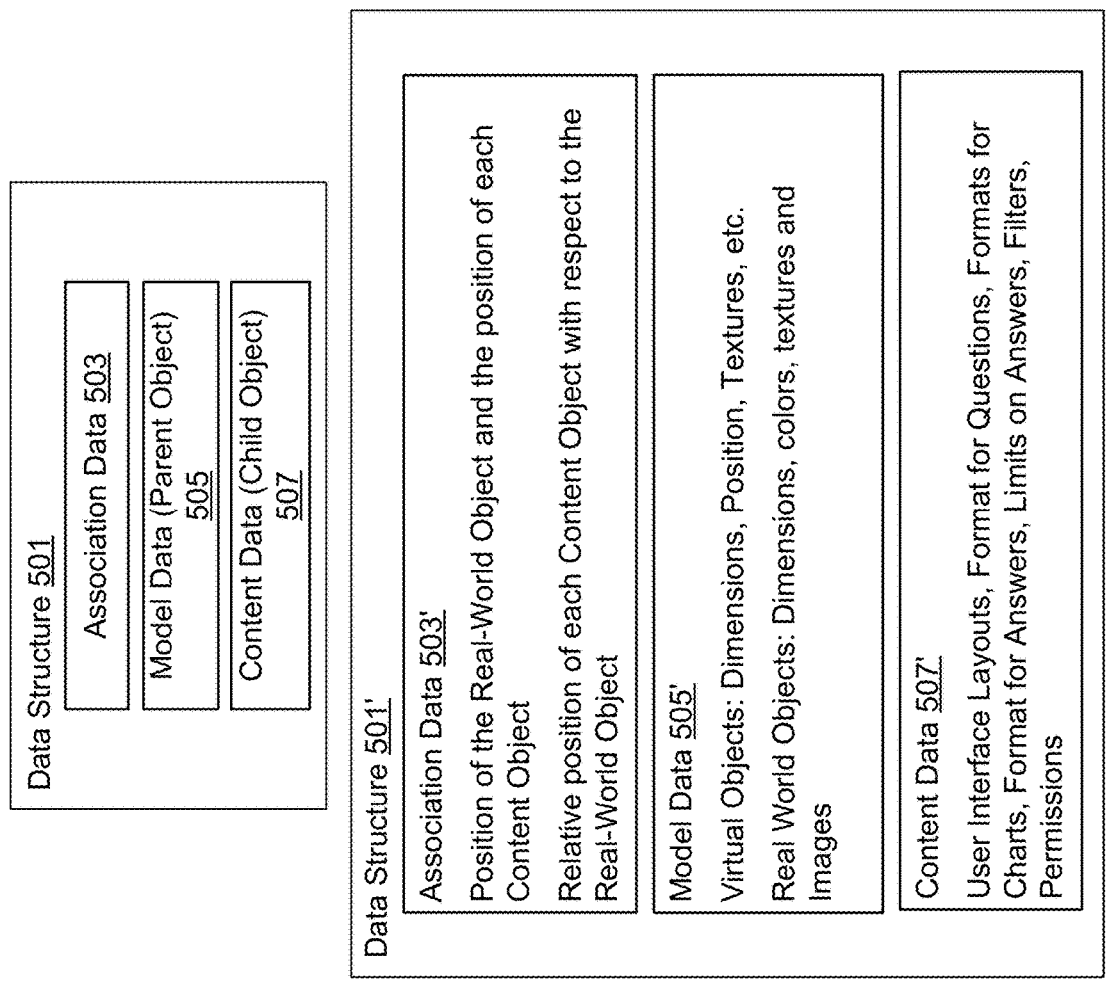
FIG. 5A is a block diagram illustrating two embodiments of the data structure for defining an association between an object and a content object in the form of a Q&A object.

Referring now to FIG. 5A, additional aspects of a data structure 501 are shown and described below. In some embodiments, the data structure 501 can include association data 503, model data 505, and content data 507. Generally described, the association data 503 defines a relationship between a parent object and the child object. The association data 503 can provide any information that enables a computing device to maintain a graphical association between a parent object and the child object. In one embodiment, the association data 503 can define relative positions between a parent object and a child object. The relative position can be defined by an offset that is generated from the difference of a coordinate position of an object 110 and a coordinate position of a content object 111.

The model data 505 defines aspects of a parent object. The content data 507 can define defines aspects of a child object. The model data 505 and the content data 507 can define images, textures, dimensions, colors, etc. The data 505 and the content data 507 can also define functional features of the parent objects and child objects. The model data 505 and the content data 507 can also comprise keywords or phrases that can be used to provide a context to the parent object and the child object.

FIG. 5A also illustrates an example of the data structure 501' that defines a relationship between an object (either a real-world object or a virtual object) and a content object in the form of a Q&A. In this example, the association data 503' defines a position for a parent object and a position for a child object. The positions can be in any suitable format including points in a 3D or 2D coordinate system. In addition, the association data 503' defines a relative position between a real-world object and the content object. The relative position between two objects can be defined by an offset. A parent object may be at a position in a coordinate system and the offset can define the location of a child object. The offset can be in any suitable format such as an 3D (X,Y,Z) offset or a 2D (X,Y) offset that defines a delta between the position of the parent object and the position of the child object.

The model data 505' can generally define physical characteristics of a parent object. In the example of FIG. 5A, if the parent object is a real-world object, the model data 505' may define dimensions, textures, colors, and other aspects of the real-world object. The model data 505' may also include images of a real-world object. If the parent object is a virtual object, the model data can define coordinates of each surface, textures of each surface, colors of each surface, etc.

The content data 507' can generally define any physical or functional characteristic of a content object 111. For instance, if the content object 111 is a real-world object, the content data 507' may define dimensions, textures, colors, and other aspects of the real-world object. The content data 507' may also include images of a content object 111. If the content object 111 is a virtual object, the content data can define coordinates of each surface, textures of each surface, colors of each surface, etc.

In the example of FIG. 5A, the content object 111 is in the form of a Q&A. Thus, the content data 507' defines user interface layouts, text formats for questions, and text formats for answers. The content data 507' also includes functional features such as user permissions and/or data filters. The permissions can define individual users or groups of users that can view the Q&A and permissions that define individual users or groups users that can provide a response to the Q&A. In addition, the permissions can control read and write permissions to individual answers to a Q&A. The filters can be used to display or hide select answers that meet a threshold priority level. A priority level can be based on a relevancy level of an answer may have with respect to a question.

FIG. 5B illustrates another example of a data structure 501" that defines a relationship between an object and a content object in the form of a Poll. In this example, the association data 503" and the model data 505" are similar to the example described above. However, in this example, the association data 503" comprises user permissions. In this example, the permissions provide a first user (User 1) with read and write permissions for the object 110 and the content object 111. In addition, the permissions provide a second user (User 2) with read-only permissions for the object 110 and the content object 111, and the permissions restrict all other users from read and write access to the object 110 and the content object 111. Although this example provides permissions for individual users, a can be appreciated that the data structure can define permissions for groups of users for either the object or the content object. In some embodiments, the permissions can include a definitions, such as a null value, that enable open access for all users to apply operations to the object or the content object.

By the use of the permissions defined in the data structure 501" a computing system can control read and write access to an object or content object with respect to specific users or specific roles. Thus, when an object and a content object is communicated to a remote computer, only certain people may build to make modifications to a parent object or a child object. In the above example, the first user may be able to move a parent object and a child object but the second user can only view the objects.

More granular permissions can be allocated to each user as well. For instance, a particular user or a group of users may be able to make a change with respect to a content object, e.g., provide informational updates (e.g., provide a vote or an answer) or change the position of the rendering relative to the parent object, but the permissions may restrict that user from making modifications to the parent object. In this example, the user may be able to move the content object around a parent, e.g., move an object from the side of a parent object to the top of the parent object, but the user cannot change the position of the parent object.

Returning to FIG. 5B, the content data 507" illustrates example attributes of the content object in the form of a voting poll. In this example, the content data 507" defines a format for the poll description, data defining chart formats, and functional features such as features on user participation and user permissions. Thus, based on permissions defining roles of various participants, certain voters can have weighted votes over other voters. Also, based on permissions defining roles of various participants, certain users or certain groups of users have access to certain aspects of the results, and permissions to cast a vote. These examples are provided for illustrative purposes and are not to be construed as limiting. It can be appreciated that the permissions can provide granular levels of control with respect to time and content. For instance, a particular identity may have the ability to access and edit an object or content object for a predetermined time or a predetermined time slot.

By the use of the permissions of the data structure 501, a system can control whether certain users or groups of users can access or edit particular iterations of a file. For instance, consider a scenario where an employee is editing a file and has several iterations of the file. The employee can set permissions for certain users to access particular iterations, e.g., certain versions, of a file, and the level of access may vary based on time. For instance, an employee may allow a particular team to have read-only access for a certain part of a workday and then provide editing access for another part of a workday.

As summarized above, the data structure 501 can be generated by one or more computing devices participating in a communication session. The data structure 501 is configured and arranged to allow a parent object and child object to be communicated to other computing devices of other communication sessions. The data structure 501 can be transmitted to a number of different types of communication sessions based on one or more events or conditions. In one illustrative example, the data structure 501 can be communicated to a remote communication session in response to a user input indicating that an object or a content object be shared with a remote communication session. In another illustrative example, the data structure 501 can be communicated to a remote communication session if user activity of the remote communication session indicates user activity that is relevant to a context defined within the data structure. Examples of these features are illustrated in FIG. 6.

Figure 6:
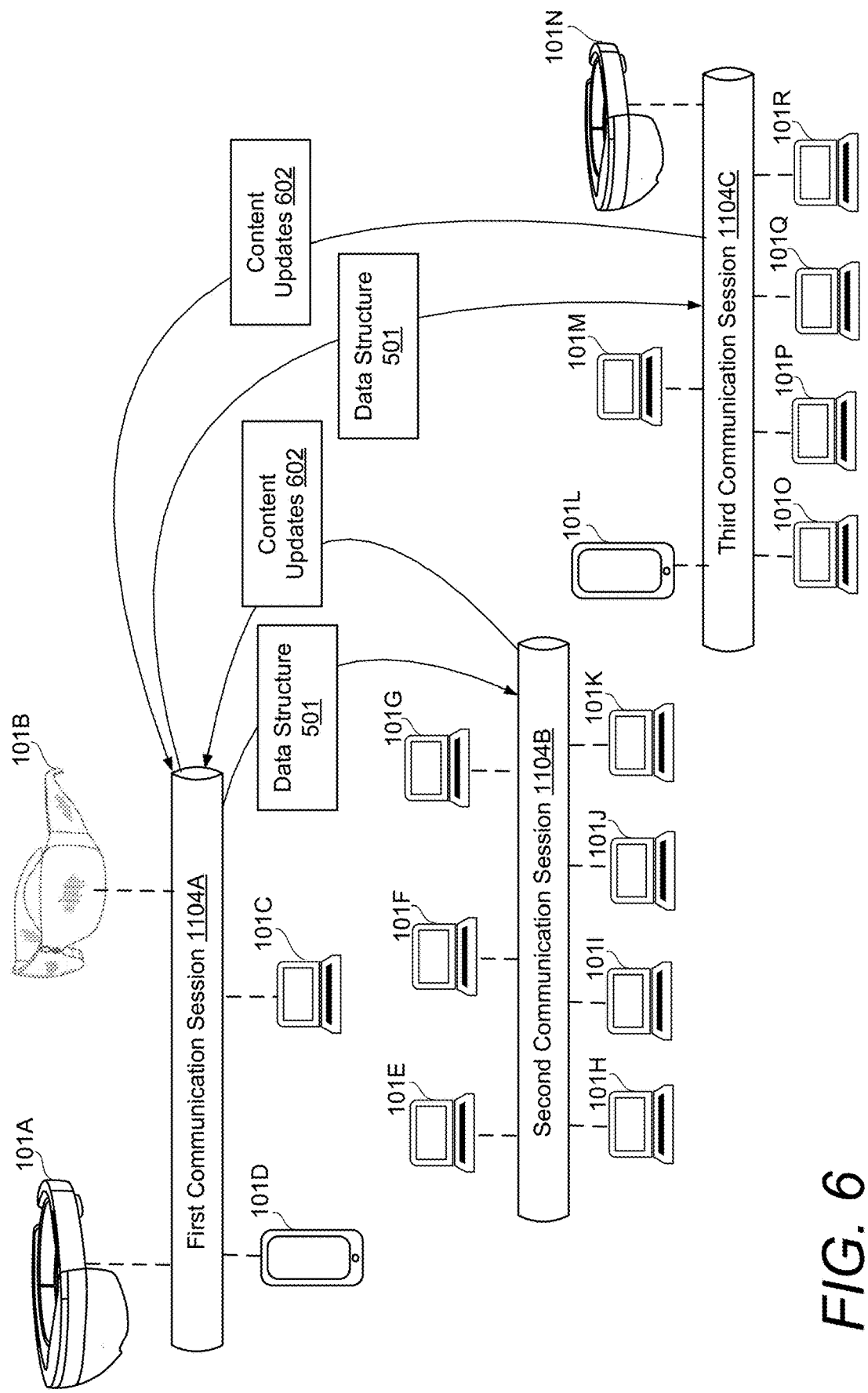
FIG. 6 is a block diagram illustrating the transmission of data structures and content updates between communication sessions.

In the example of FIG. 6, a data structure 501 is generated by one or more computing devices (101A-101D) of a first indication session 1104A. The data structure 501 can include a definition two or more objects having a parent-child association. The data structure 501 can be communicated to any computing device (101E-101K) of the second communication session 1104B or any computing device (101L-110R) of the third communication session 1104C in response to one or more events. In one illustrative embodiment, the data structure 501 can be communicated to the second communication session or the third communication session based on a request received from any computing device (101E-101R) of a remote communication session. In another illustrative embodiment, the data structure 501 can be pushed to the second communication session or the third communication session from a command issued by a computing device (101A-101D) of the first communication session 1104A. In yet another embodiment, user activity detected at any computing device (101E-101R) that indicates an interest in the objects defined in the data structure 501 can invoke a request for the data structure 501. Thus, any user activity, such as conversations, chats, or gestures, that includes keywords or other identifiers having a threshold level of similarity to a context defined in the data structure 501, causes a delivery of the data structure 501 to the appropriate communication session. When the data structure 501 includes functional capabilities of collecting information, such as a Q&A or Poll, the data structure 501 can cause a remote communication session to collect information from participants of the remote communication session and send content updates 602 back to the originating communication session. Thus, a Q&A or Voting Poll generated by the first communication session 1104A, can readily share information with other communication sessions to collect votes or feedback from users that did not participate in the communication session that originated the data structure 501.

Figure 7A:
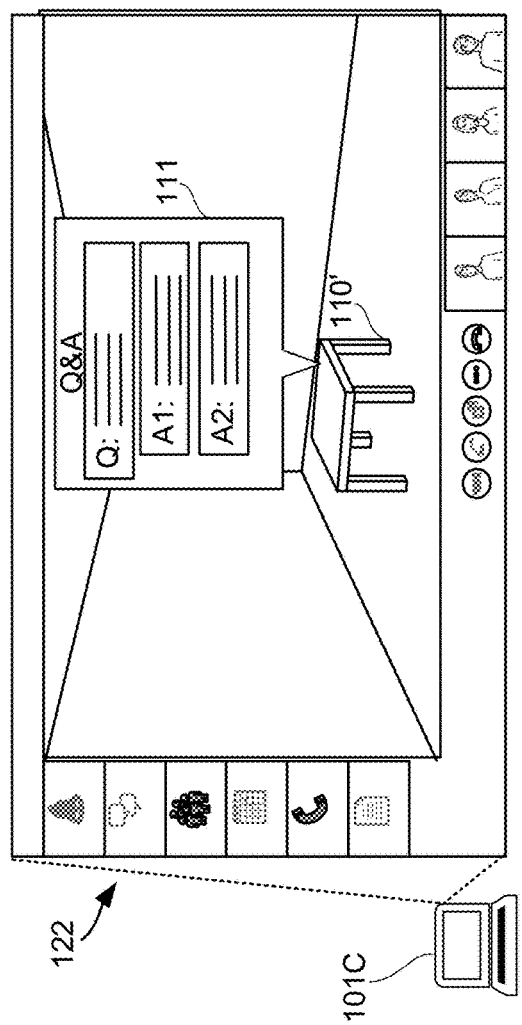
FIG. 7A illustrates a scenario where two computers of different communication sessions can concurrently display an object of the content object of a single data structure.
Figure 7A:
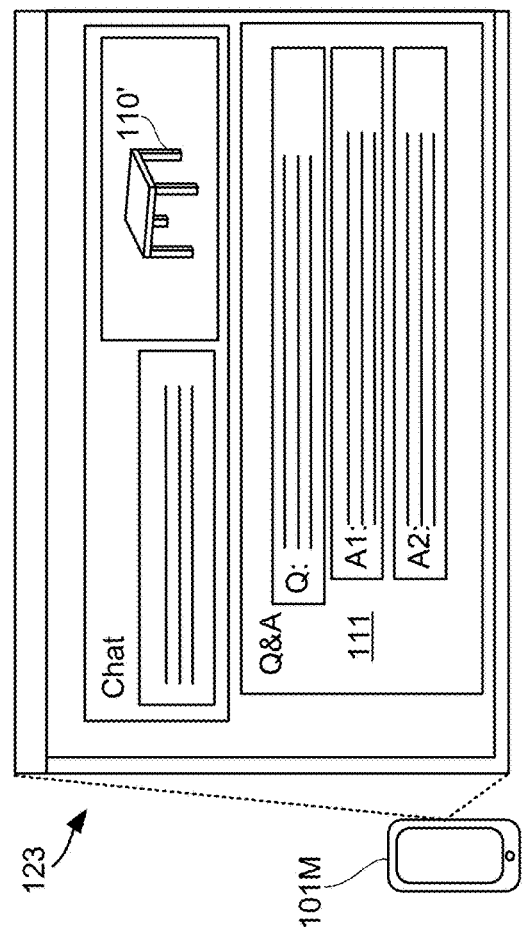

FIG. 7A illustrates one example where the third computing device 101C of the first communication session 1104A initiates a Q&A (content object 111) associated with a rendering of an object 110'. In this example, a chat is managed by a computing device 101M of the third communication session 1104C. Users participating in the chat indicated an interest in the table that was referenced in the first communication session. In response to the detection of such user activity, the data structure defining the table and the associated Q&A, is communicated to the third communication session 1104C. In this example, the second computing device 101M of the third communication session 1104C receives the data structure 501 and displays aspects of the Q&A in association with an image of the object, e.g., the table. In this example, the content object and the object are displayed based on the data structure 501 and a context of the user interface 123. In this example, the layout display of the object and the content object is modified to accommodate a particular category of the user interface. To implement this feature, a computing device may analyze a user interface of an application. If a user interface is within a particular category, e.g., a chat user interface, a MS Teams user interface, a virtual-reality user interface, or any other category of user interfaces, the computing device may adjust the layout of the content object. As shown in the bottom right user interface of FIG. 7A, the content object 111 is displayed with a different orientation with respect to the object 110 given that the objects are displayed on a private chat user interface 123. However, on the Teams user interface 122, the content object 111 is displayed with a different orientation with respect to the rendering of object 110'.

In another feature shown in FIG. 7A, the user of the second computing device 101M of the third communication session 1104C can automatically connect to the first communication session 1104A by interacting with the user interface 123. For instance, a user can select the rendering of the object 110' and in response to such an input, the second computing device 101M of the third communication session 1104C can automatically connect to the first communication session 1104A. This concept referred to herein as "teleporting" allows users to switch to a different communication session that originated the object 110 or the content object 111. Not only does this feature allow users to discover the existence of relevant communication sessions, this feature gives users an easy way to move to different communication sessions without the need to take manual steps to disconnect and reconnect a device from and to a communication session.

Figure 7B:
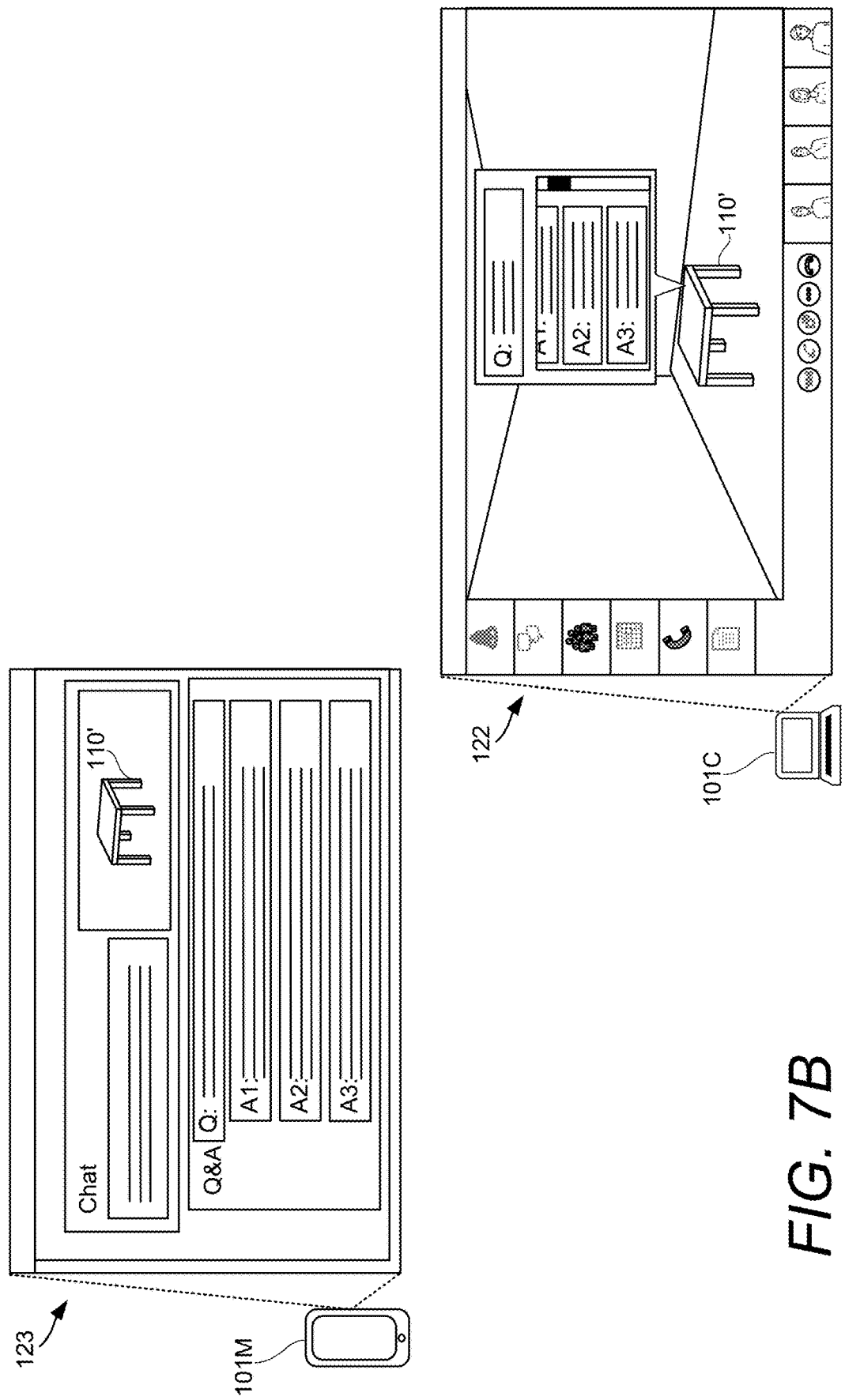
FIG. 7B illustrates a scenario where two computers of different communication sessions can display and receive updates to a Q&A object.

Continuing the present example in FIG. 7B, when a user provides an additional answers (A3) to the Q&A, one or more computers of the third communication session 1104C provides content updates (602 of FIG. 6) to one or more computers of the first communication session 1104A. In response, as shown in the lower right UI of FIG. 7B, computers that are participating in the first communication session, such as computing device 101C, can readily display the additional answer provided by computer of the third communication session.

The content updates 602 can include a number of different types of information. For instance, in FIG. 7B, if a user of computing device 101M moves the rendering of the object 110' to the left or to the right, the computing device 101C will receive the content update 602 indicating the input and move the rendering of the object 110' and the associated content object 111. In such an example, the computing device 101C will only move the rendering of the object 110' and the associated content object 111 if the data structure 501 provides the appropriate permissions for allowing a user to invoke a graphical move of an object.

Figure 8A:
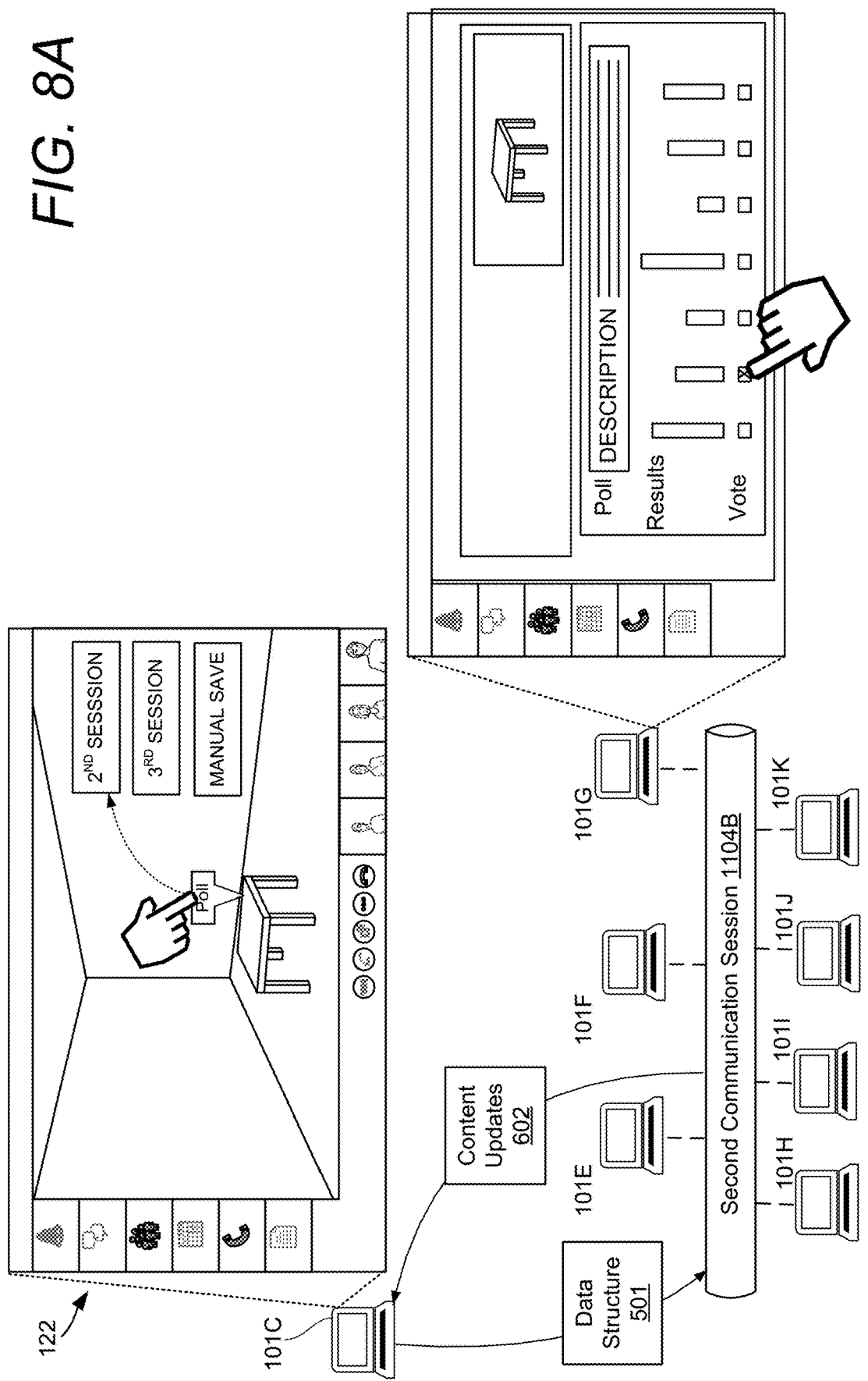
FIG. 8A is a block diagram illustrating the communication of the data structure and a content update in response to a user command applied to a content object.

FIG. 8A illustrates another example of a mechanism that can cause the communication of the data structure 501. In this example, a user of computing device 101C of the first communication session provides a gesture to move the content object 111 to a remote communication session, the second communication session 1104B. In this example, the content object to 111 involves a voting poll. In response to the input, the data structure 501 is communicated to the computing devices of the second communication session. Once the data structure 501 is received by the computers of the second communication session 1104B, the child object and the parent object are displayed in association with one another. In this example, the data structure 501 causes the third computing device 101G of the second communication session 1104B to display aspects of the voting poll. In this example, the data structure 501 instructs the computing device to display a description of the voting poll, results having a particular chart type (e.g., bar chart, line chart, scatter chart, etc.), and one or more input elements for receiving an input from one or more users. In this example, a user of the computing device 101G has selected the second graphical element indicating a vote for a selected candidate. Such user inputs can cause the computing device 101G to generate a content update and such content updates can be sent back to the originating communication session, i.e., the first communication session 1104A.

Figure 8B:
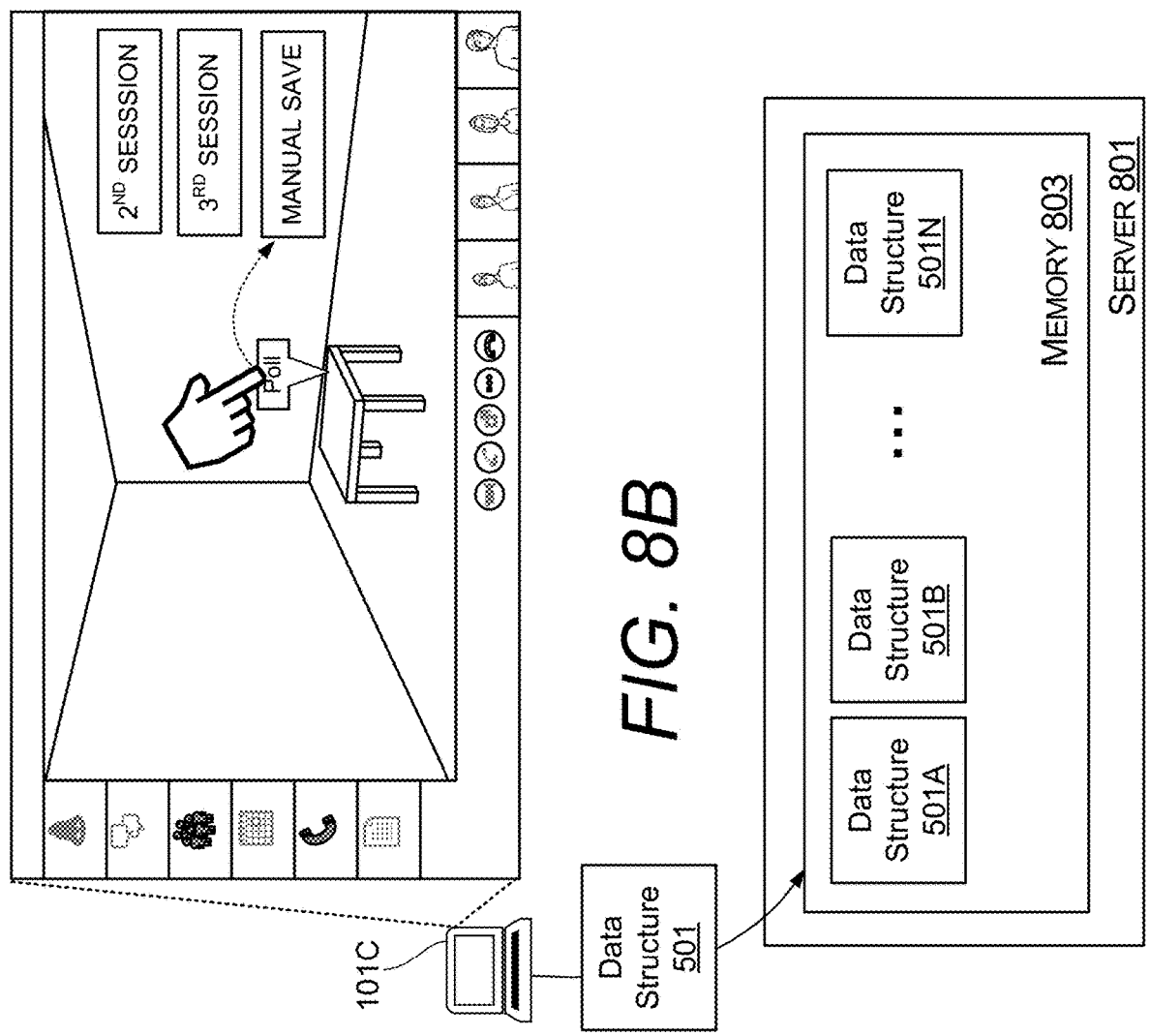
FIG. 8B is a block diagram illustrating the communication of the data structure to a server in response to a user command applied to a content object.

FIG. 8B illustrates another example of a mechanism that can cause a computing device to share a data structure 501 with a central service, e.g. a server 801, for providing persistent storage of the data structure 501. In this example, a user of a computing device 101C of the first communication session 1104A provides a gesture to save the content object, which in this case is in the form of a Q&A. The gesture to save the content object causes the computing device to save the entire data structure defining the content object and its associated objects.

The action of receiving the data structure 501 in a remote device, such as a server 801, can be based on a number of actions. For instance, a computing device managing a communication session, such as computing device 101C, can periodically save data structures 501 to any storage medium that allows computers of any communication session to access the data structure 501. The data structures 501 can also be saved in response to an event, such as an update to a content object or an object, or based on other events.

In one illustrative embodiment, a data structure 501 can also comprise historical data. The historical data can provide a history of all edits and all position moves that were applied to a content object or an object. The historical data can also provide identities of each individual and the specific description of the operations that were applied by each individual to a content object or an object. The historical data can also provide a description of a communication session that was associated with each individual that applied at operation to a content object or an object. The historical data can be utilized by any computing device for a number of purposes. For instance, if a particular individual applied a number of edits to a particular object, and that particular individual was mentioned in a remote communication session, such as a private chat session between other users, the data structure defining that particular object may be communicated automatically to that private chat session.

Figure 9:
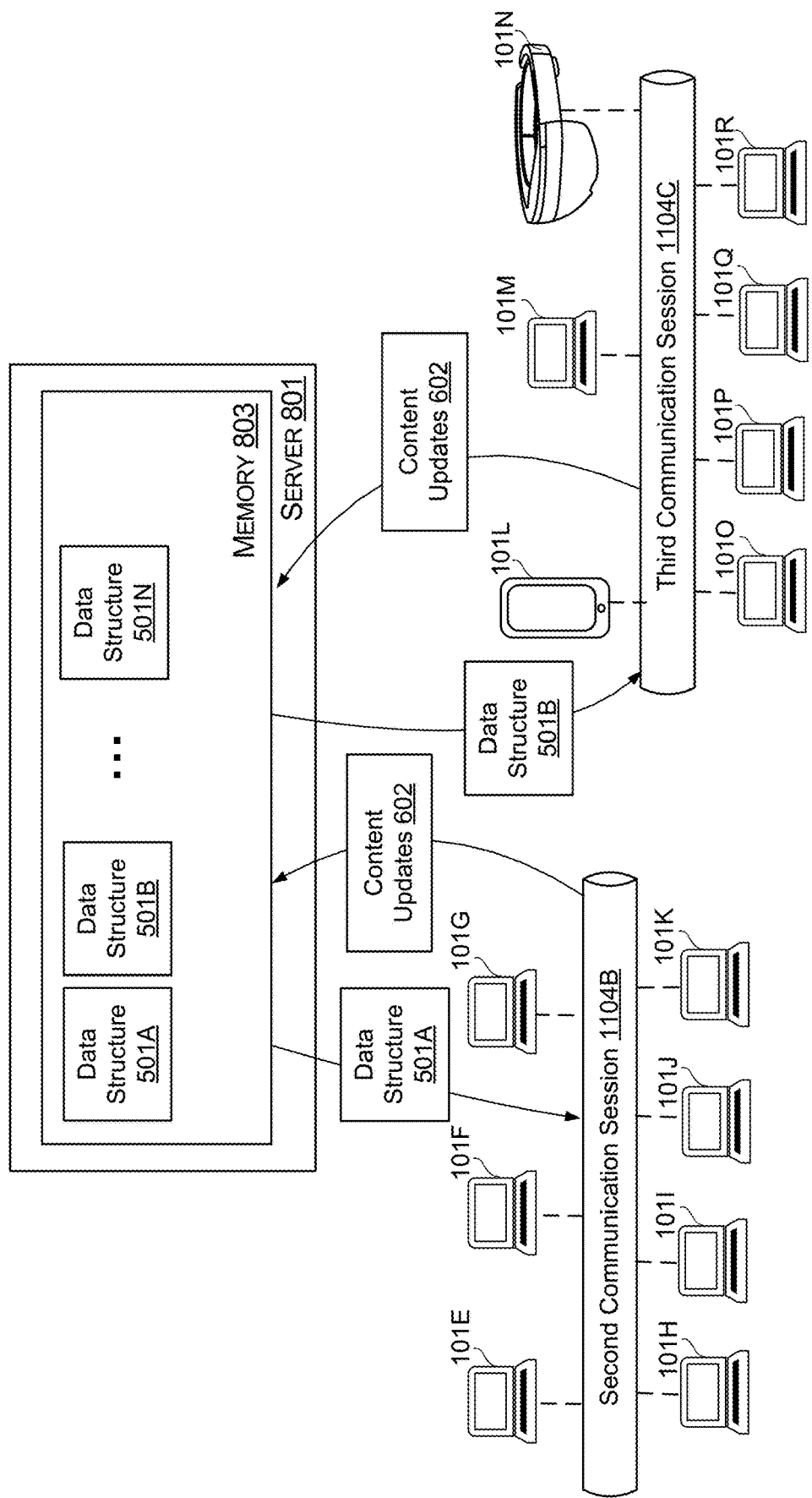
FIG. 9 is a block diagram illustrating the communication of one or more data structures in response to events detected at different communication sessions.

In this example, the data structure 501 is saved in a memory device 803 of a server 801. The server 801 can be configured to persistently store any number of data structures 501A through 501N, and have the ability to communicate any one of the data structures to a communication session or an individual computing device indicating a computing process requiring a content object or an object described in the data structure 501. As shown in FIG. 9, any communication session, such as the second communication session 1104B and the third communication session 1104C can retrieve data structures from the server 801. In addition, the server 801 can update the content of each data structure by receiving content updates 602 from computing devices of each communication session.

These examples are provided for illustrative purposes and are not to be construed as limiting. Although these examples perform one or more operations based on a user input, it can be appreciated that the one or more operations can be invoked by the detection of a predetermined event. For example, a particular user scenario such as the presence of a particular user in a communication session or the presence of particular content may cause one or more operations to be invoked. In other example, one or more operations can be invoked by an intelligent agent. For instance, an object or content object may be an autonomous agent. In such an embodiment, the autonomous agent may decide to migrate from one communication session to another based on threshold level of relevancy with shared content of a communication session.

Although these examples illustrate a user input that is directed towards a particular type of content object, e.g., a Q&A or a Voting Poll, it can be appreciated that the data structure defining the object of the child object can be communicated in response to a gesture that is directed to other objects, such as a parent object. By the use of the techniques disclosed herein a command that indicates a selection of a parent or a child, a computing device is configured to apply in operation to the selected parent or child and also replicate that same operation to an associated parent or child based on the attributes defined in the data structure 501.

Figure 10:
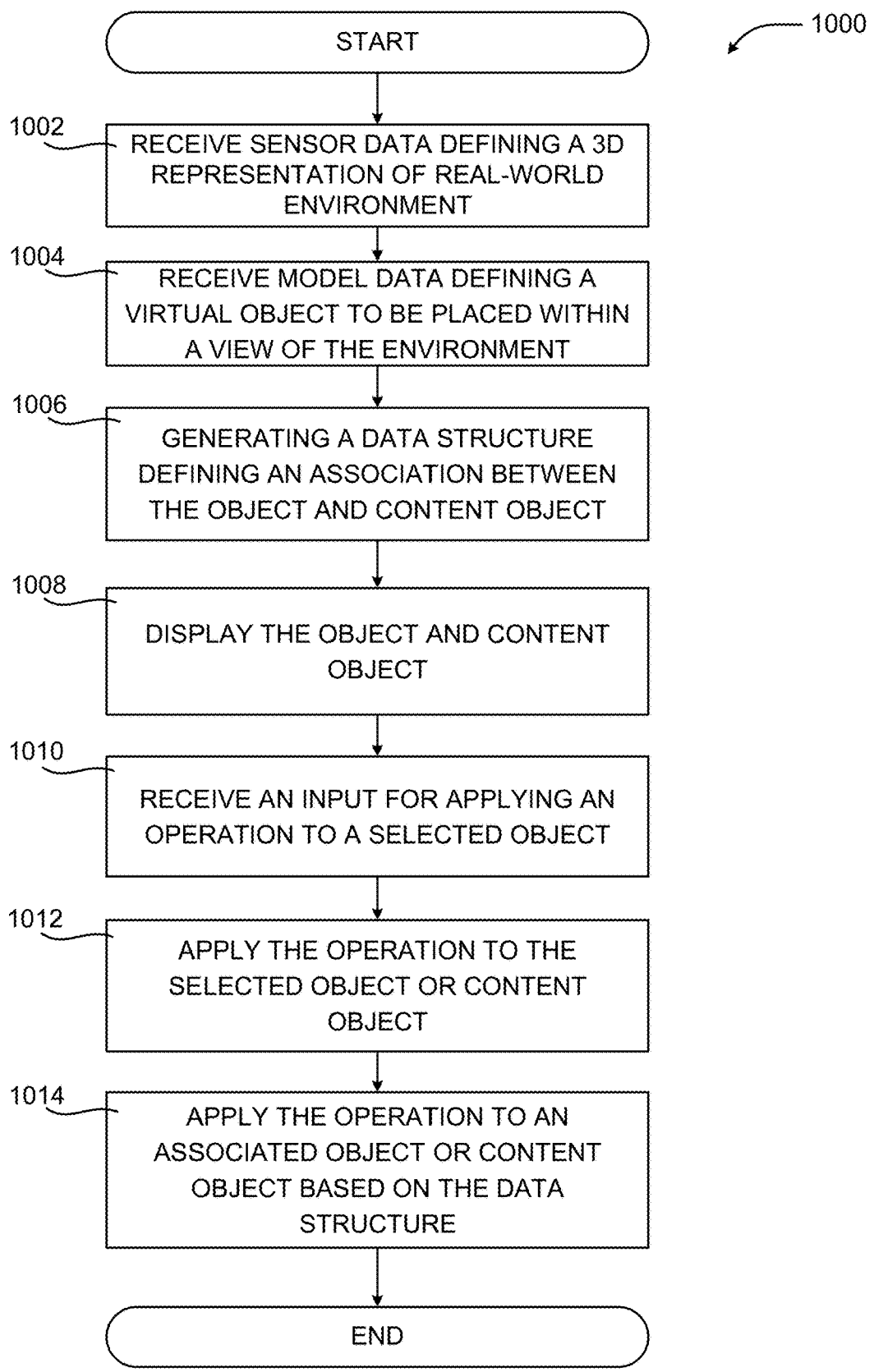
FIG. 10 is a flow diagram illustrating aspects of a routine for computationally efficient management of content.

FIG. 10 is a diagram illustrating aspects of a routine 1000 for computationally efficient management of content that is associated with objects displayed within communication sessions. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 1000 begins at operation 1002, where the computing device 101 receives sensor data that defines a 3D representation of a real-world environment. The sensor data can be captured by a depth map sensor, e.g., a depth map camera. In addition, the sensor data can be captured by an image sensor, e.g. a camera, where the depth map sensor and the image sensor can be part of the same component or in separate components. The sensor data comprises depth map data defining a three-dimensional model of a real-world environment and an image of the real-world environment. For instance, a real-world environment may include the walls of a room and a particular object within the room, such as the real-world object 110 shown in FIG. 1. The sensor data can define physical properties of an object in a real-world environment. The sensor data also indicates a position of one or more objects within an environment. For illustrative purposes, the real-world object is also referred to herein as the "object 110."

The routine 1000 also comprises operation 1004, where the computing device 101 receives model data defining one or more virtual objects to be displayed within a view of the collaborative environment. The model data can define specific positions where the virtual objects are to be placed within a user interface of the communication session. For illustrative purposes, a virtual object that is positioned as a result of any received model data is referred to herein as a "content object 111." In some configurations, operation 1004 comprises receiving an input from a user causing generation of model data defining one or more content objects 111. Examples of a content object 111 can include, but is not limited to, an arrow, and annotation, a Q&A object, a voting poll object, etc. An input may define a position of a content object 111 in the input may also identify an associated object 110. For instance, if a position of a new content object 111 is within a predetermined distance of an object 110, the new content object 111 can be associated with the object 110.

The routine 1000 also comprises operation 1006, where the computing device 101 generates a data structure defining the association between the content object 111 and the associated object 110. In some configurations, the data structure defines a position of the content object 111 and the position for the associated object 110. The data structure may also define a positional offset between the position of the content object 111 relative to the position of the object 110. In one illustrative example, the object 110 is categorized as a parent object and the content object 111 is categorized as a child object. The data structure may also comprise permissions for individual users or groups of users. The permissions allow individual users or groups of users to apply operations to the objects. In addition, the permissions may prevent one or more users from applying one or more operations to an object.

The routine 1000 continues at operation 1008, where the computing device 101 displays the content object 111 and the associated object 110. The display of the content object 111 and the associated object 110 is arranged to illustrate a graphical association between the two objects. In some configurations a graphical association can be identified by a proximity or a distance between the two objects. In other embodiments, a graphical element, such as a line or arrow, can graphically connect the two objects to show graphical association.

Next, the routine 1000 continues at operation 1010, with the computing device 101 receives an input to apply a selected operation to the object 110 or an associated content object 111. The input can be a user input or the input can be a computer-generated instruction. The user input can be in the form of a voice command, a gesture, and interaction with a display screen or any other type of input through an input device. The input can apply to an object or a content object. For instance, the example of FIG. 3B shows a user input that is applied to a content object 111A, the Q&A content object. An example of a user input that is applied towards an object, with reference to FIG. 3B, would include a user input that is directed towards the rendering of the object 110' (e.g., the table).

Next, at operation 1012, the computing device 101 applies the selected operation to the selected object or the selected content object. For instance, in the above example where the user input is directed towards the content object, e.g., the Q&A content object, the computing device applies the selected operation to the content object. An example of a selected operation may comprise moving the selected content object within a display screen. In the current example, such an operation would move the rendering of the Q&A content object within a display screen. Another example of a selected operation may comprise transmitting the selected content object to computing devices of a remote communication session. In the current example, such an operation would cause a transmission of the Q&A content object to the computing device of the remote communication session.

Next, at operation 1014, the computing device 101 applies the selected operation to an associated object or content object based on the data structure. In the current example, in response to determining that an input command is applied to a content object 111, the computing device would apply the selected operation to the associated object, e.g., the table, based on the attributes of the data structure. Operation 1014 may include an analysis of the data structure to determine all of the related objects, related content objects, and also determine one or more permissions for applying the selected operation. A computing device may prevent the application of the selected operation if the permissions do not indicate that the selected operation has access to the associated object or associated content object.

With reference to the example shown in FIG. 3B, in situations where there are multiple content objects 111 associated with a single object 110, operation 1014 would also include applying the selected operation to the other content objects, e.g., the second content object 111B and the third content object 111C, based on the associations defined in the data structure. In the example shown in FIG. 3B, the second content object 111B and the third content object 111C are also moved based on a move command that is applied towards an associated content object, the first content object 111A.

Operation 1014 can also involve applying the selected operation to an associated content object. For instance, if the input is directed towards an object 110, operation 1014 would apply the selected operation to an associated content object in accordance with a data structure.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
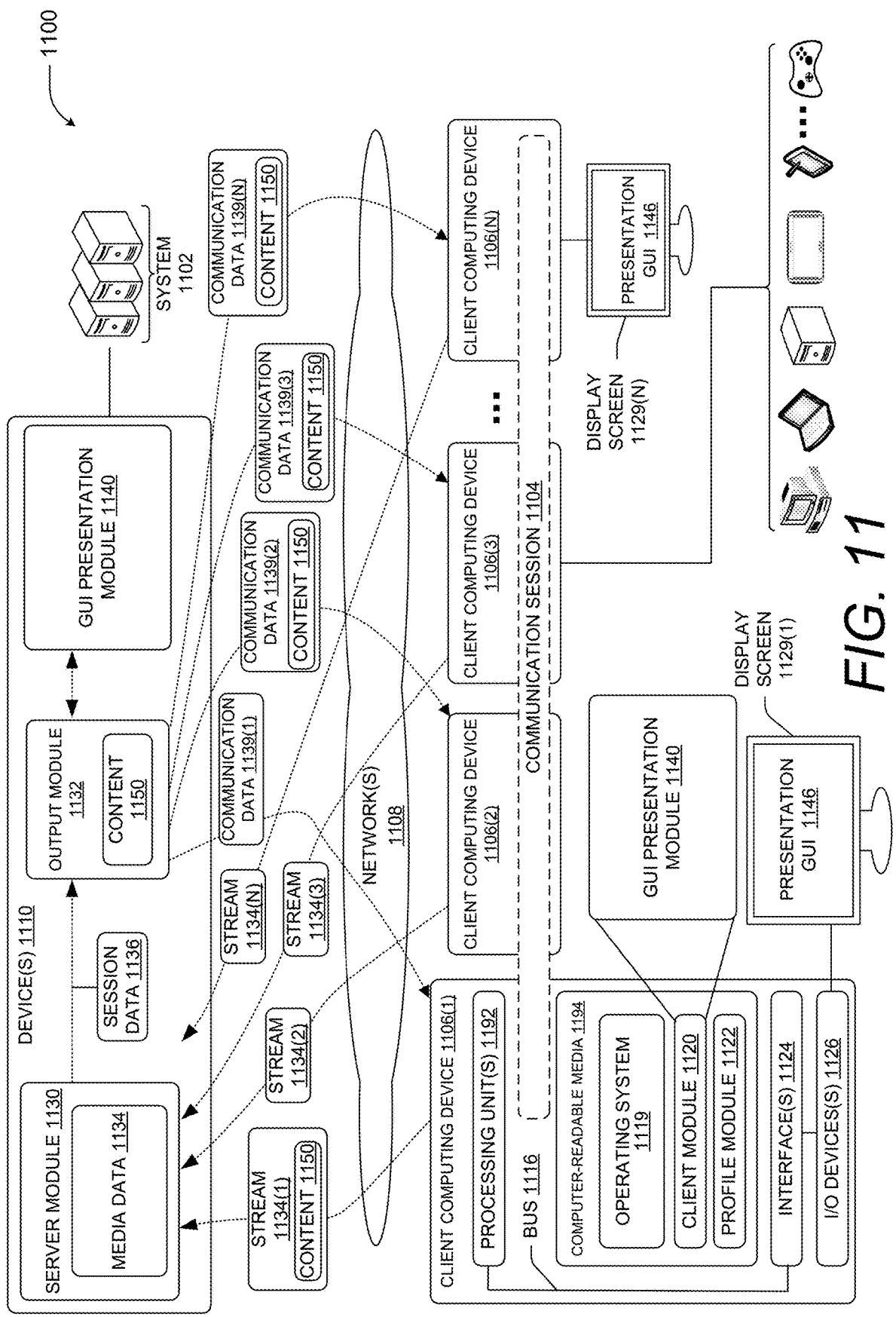
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, share data defining one or more objects that are displayed to users of a communication session 1004.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. For instance, the first client computing device 1106(1) may be the computing device 101 of FIG. 1 or the computing device 1300 of FIG. 13.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1112 operably connected to computer-readable media 1184 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134 (N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1138 to the client computing devices (e.g., client computing devices 1106(1) through 1106(3) participating in a live viewing of the communication session). The communication data 1138 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include UI presentation module 1140. The UI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the UI presentation module 1140 may provide video, image, and/or content to a presentation UI 1146 rendered on the display screen 1129 of the associated client computing device 1106. The presentation UI 1146 may be caused to be rendered on the display screen 1129 by the UI presentation module 1140. The presentation UI 1146 may include the video, image, and/or content analyzed by the UI presentation module 1140.

In some implementations, the presentation UI 1146 may include a plurality of sections or grids that may render or comprise video, image, and/or content for display on the display screen 1129. For example, a first section of the presentation UI 1146 may include a video feed of a presenter or individual, a second section of the presentation UI 1146 may include a video feed of an individual consuming meeting information provided by the presenter or individual. The UI presentation module 1140 may populate the first and second sections of the presentation UI 1146 in a manner that properly imitates an environment experience that the presenter and the individual may be sharing.

In some implementations, the UI presentation module 1140 may enlarge or provide a zoomed view of the individual represented by the video feed in order to highlight a reaction, such as a facial feature, the individual had to the presenter. In some implementations, the presentation UI 1146 may include a video feed of a plurality of participants associated with a meeting, such as a general communication session. In other implementations, the presentation UI 1146 may be associated with a channel, such as a chat channel, enterprise teams channel, or the like. Therefore, the presentation UI 1146 may be associated with an external communication session that is different than the general communication session.

Figure 12:
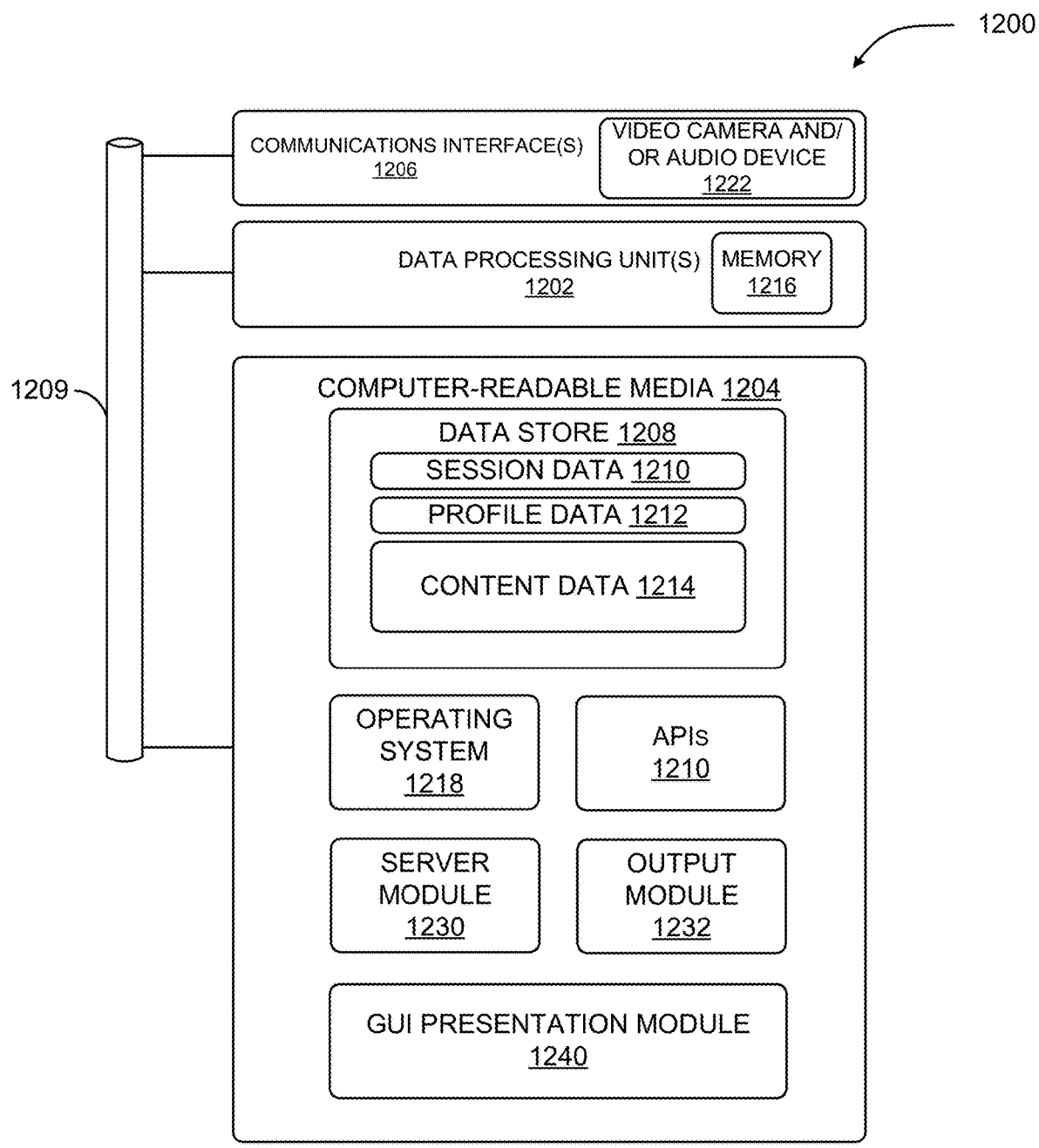
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects 116, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1208, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

Figure 13:
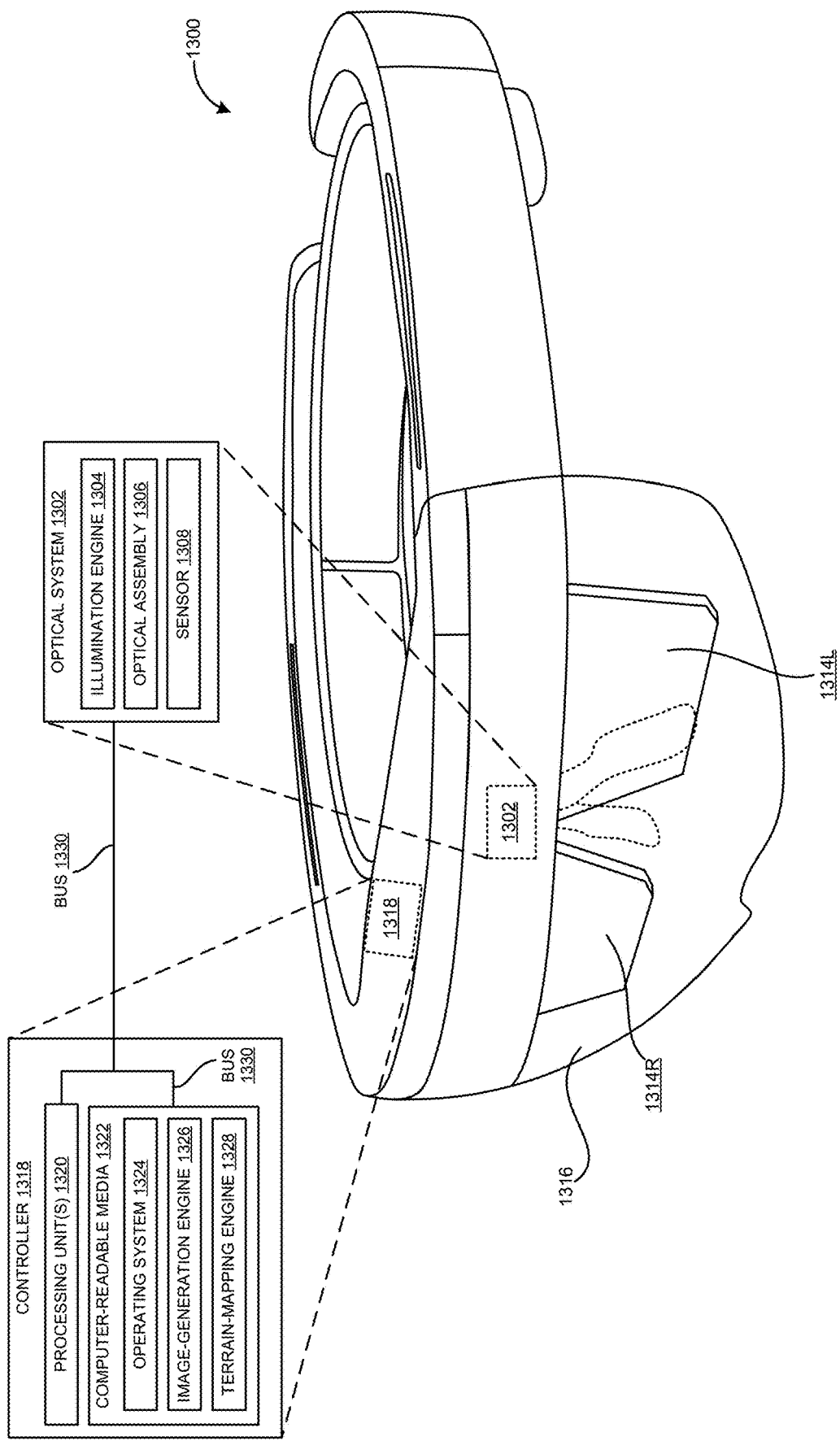
FIG. 13 is a computing device diagram showing aspects of the configuration and operation of a MR device that can implement aspects of the disclosed technologies, according to one embodiment disclosed herein.

FIG. 13 is a computing device diagram showing aspects of the configuration and operation of a computing device 1300 that can implement aspects of the systems disclosed herein. The computing device 1300 shows details of the computing device 101 shown in FIG. 1. The computing device 1300 can provide augmented reality ("AR") environments or virtual reality ("VR") environments. Generally described, AR environments superimpose computer-generated ("CG") images over a user's view of a real-world environment. For example, a computing device 1300 can generate composite views to enable a user to visually perceive a computer-generated image superimposed over a rendering of a real-world environment 112, wherein the rendering of the real-world environment 112 is created by a camera 105 directed to the real-world environment, such as a room. In some embodiments, a computing device 1300 can generate composite views to enable a user to visually perceive a computer-generated image superimposed over a direct view of a real-world environment 112. Thus, the computing device 1300 may have a prism or other optical device that allows a user to see through the optical device to see a direct view of a real-world object or a real-world environment, and at the same time, a computer-generated image superimposed over that view of a real-world object. An AR environment can also be referred to herein as a mixed reality ("MR") environment. An MR device can provide both AR and VR environments. A VR environment includes computer-generated images of a virtual environment and virtual objects. MR and AR environments can utilize depth map sensors to determine a distance between the device and a real-world object. This allows the computer to scale and position a computer-generated graphic over a real-world object in a realistic manner.

In the example shown in FIG. 13, an optical system 1302 includes an illumination engine 1304 to generate electromagnetic ("EM") radiation that includes both a first bandwidth for generating CG images and a second bandwidth for tracking physical objects. The first bandwidth may include some or all of the visible-light portion of the EM spectrum whereas the second bandwidth may include any portion of the EM spectrum that is suitable to deploy a desired tracking protocol. In this example, the optical system 1302 further includes an optical assembly 1306 that is positioned to receive the EM radiation from the illumination engine 1304 and to direct the EM radiation (or individual bandwidths thereof) along one or more predetermined optical paths.

For example, the illumination engine 1304 may emit the EM radiation into the optical assembly 1306 along a common optical path that is shared by both the first bandwidth and the second bandwidth. The optical assembly 1306 may also include one or more optical components that are configured to separate the first bandwidth from the second bandwidth (e.g., by causing the first and second bandwidths to propagate along different image-generation and object-tracking optical paths, respectively).

In some instances, a user experience is dependent on the computing device 1300 accurately identifying characteristics of a physical object 103 (a "real-world object") or plane (such as the real-world floor) and then generating the CG image in accordance with these identified characteristics. For example, suppose that the computing device 1300 is programmed to generate a user perception that a virtual gaming character is running towards and ultimately jumping over a real-world structure. To achieve this user perception, the computing device 1300 might obtain detailed data defining features of the real-world environment 112 around the computing device 1300. In order to provide this functionality, the optical system 1302 of the computing device 1300 might include a laser line projector and a differential imaging camera (both not shown in FIG. 13) in some embodiments.

In some examples, the computing device 1300 utilizes an optical system 1302 to generate a composite view (e.g., from a perspective of a user that is wearing the computing device 1300) that includes both one or more CG images and a view of at least a portion of the real-world environment 112. For example, the optical system 1302 might utilize various technologies such as, for example, AR technologies to generate composite views that include CG images superimposed over a real-world view. As such, the optical system 1302 might be configured to generate CG images via an optical assembly 1306 that includes a display panel 1314.

In the illustrated example, the display panel includes separate right eye and left eye transparent display panels, labeled 1314R and 1314L, respectively. In some examples, the display panel 1314 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS AR device) and within a dual-eye device (e.g. the MICROSOFT HOLOLENS AR device).

Light received from the real-world environment 112 passes through the see-through display panel 1314 to the eye or eyes of the user. Graphical content computed by an image-generation engine 1326 executing on the processing units 1320 and displayed by right-eye and left-eye display panels, if configured as see-through display panels, might be used to visually augment or otherwise modify the real-world environment 112 viewed by the user through the see-through display panels 1314. In this configuration, the user is able to view virtual objects 104 that do not exist within the real-world environment 112 at the same time that the user views physical objects 103 within the real-world environment 112. This creates an illusion or appearance that the virtual objects 104 are physical objects 103 or physically present light-based effects located within the real-world environment 112.

In some examples, the display panel 1314 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the computing device 1300 further includes an additional see-through optical component, shown in FIG. 13 in the form of a transparent veil 1316 positioned between the real-world environment 112 and the display panel 1314. It can be appreciated that the transparent veil 1316 might be included in the computing device 1300 for purely aesthetic and/or protective purposes.

The computing device 1300 might further include various other components (not all of which are shown in FIG. 13), for example, front-facing cameras (e.g. red/green/blue ("RGB"), black & white ("B&W"), or infrared ("IR") cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver, a laser line projector, a differential imaging camera, and, potentially, other types of sensors. Data obtained from one or more sensors 1308, some of which are identified above, can be utilized to determine the orientation, location, and movement of the computing device 1300. As discussed above, data obtained from a differential imaging camera and a laser line projector, or other types of sensors, can also be utilized to generate a 3D depth map of the surrounding real-world environment 112.

In the illustrated example, the computing device 1300 includes one or more logic devices and one or more computer memory devices storing instructions executable by the logic device(s) to implement the functionality disclosed herein. In particular, a controller 1318 can include one or more processing units 1320, one or more computer-readable media 1322 for storing an operating system 1324, and image-generation engine 1326 and a terrain-mapping engine 1328, and other programs (such as a 3D depth map generation module configured to generate the depth map data ("mesh data") in the manner disclosed herein), and data.

In some implementations, the computing device 1300 is configured to analyze data obtained by the sensors 1308 to perform feature-based tracking of an orientation of the computing device 1300. For example, in a scenario in which the object data includes an indication of a stationary physical object 103 within the real-world environment 112 (e.g., an engine), the computing device 1300 might monitor a position of the stationary object within a terrain-mapping field-of-view ("FOV"). Then, based on changes in the position of the stationary object within the terrain-mapping FOV and a depth of the stationary object from the computing device 1300, a terrain-mapping engine executing on the processing units 1320 AR might calculate changes in the orientation of the computing device 1300.

It can be appreciated that these feature-based tracking techniques might be used to monitor changes in the orientation of the computing device 1300 for the purpose of monitoring an orientation of a user's head (e.g., under the presumption that the computing device 1300 is being properly worn by a user 102). The computed orientation of the computing device 1300 can be utilized in various ways, some of which have been described above.

The processing unit(s) 1320, can represent, for example, a central processing unit ("CPU")-type processor, a graphics processing unit ("GPU")-type processing unit, an FPGA, one or more digital signal processors ("DSPs"), or other hardware logic components that might, in some instances, be driven by a CPU. For example, and without limitation, illustrative types of hardware logic components that can be used include ASICs, Application-Specific Standard Products ("ASSPs"), System-on-a-Chip Systems ("SOCs"), Complex Programmable Logic Devices ("CPLDs"), etc. The controller 1318 can also include one or more computer-readable media 1322, such as the computer-readable media described above.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system for creating and tracking associations between a content object and an object comprising:
    one or more data processing units; and a computer-readable medium having encoded thereon computer-executable instructions to cause the one or more data processing units to receive input data indicating a position for the content object to be displayed in association with the object rendered on one or more computing devices of a communication session;

generate a data structure defining the association between the content object and the object, the position of the content object and a position of the object, characteristics of the object content and characteristics of the object, and one or more permissions for applying an operation to the content object or the object;

detect an input indicating the operation to graphically move the content object or the object;

in response to detecting that the operation is to be applied to the content object, apply the operation to the content object and replicate the operation to the object based on the one or more permissions defined in the data structure allowing the object to be graphically moved with the content object, wherein the operation applied to the content object is further applied to at least one associated object based on the one or more permissions defined in the data structure allowing the object to be graphically moved with the content object; and in response to detecting that the operation is to be applied to the object, apply the operation to the object and replicate the operation to the content object based on the one or more permissions defined in the data structure allowing the content object to be graphically moved with the object, wherein the operation applied to the object is further applied to at least one associated content object based on the one or more permissions defined in the data structure allowing the content object to be graphically moved with the object.

2. The system of claim 1, wherein the operation further comprises instructions for sending the object to a remote computing device of a second communication session, wherein applying the operation to the object and replicating the operation to the content object comprises:

communicate model data defining the object to the remote computing device; and communicate model data defining the content object to the remote computing device in response to verifying the association defined in the data structure, wherein the data structure provides computing devices of the second communication session access to the object and the content object.

3. The system of claim 2, wherein the data structure defines a plurality of content objects and permissions for individual content objects of the plurality of objects, wherein the communication of the model data defining the content object is based on the permissions associated with content object.

4. The system of claim 1, wherein the operation further comprises instructions for sending the content object to a remote computing device of a second communication session, wherein applying the operation to the content object and replicating the operation to the object comprises:

communicate model data defining the content object to the remote computing device; and communicate model data defining the object to the remote computing device in response to verifying the association defined in the data structure, wherein the data structure provides computing devices of the second communication session access to the object and the content object.

5. The system of claim 1, wherein detecting the input indicating the operation comprises:

analyzing streams between a plurality of computers of a second communication session;

determining that at least one stream comprises at least one reference to the object or the content object, wherein the operation comprises instructions for sending the content object and the object to the remote computing device in response to determining that the at least one stream comprises the at least one reference to the object or the content object.

6. The system of claim 1, wherein the data structure further comprises historical data defining one or more operations previously applied to the content object or the object.

7. The system of claim 1, wherein the one or more permissions are configured to allow or deny individual users from moving the object, wherein repositioning the rendering of the object is denied or allowed based on the permissions.

8. A method for execution on a computing device, comprising:

receiving input data indicating a position for a content object to be displayed in association with an object rendered on one or more computing devices of a communication session;

generating a data structure defining an association between the content object and the object, the position of the content object and a position of the object, characteristics of the object content and characteristics of the object, one or more permissions for applying an operation to the content object or the object;

receiving an input invoking the operation causing the content object or the object to be communicated to a remote computing device participating in a second communication session;

in response to detecting that the operation is to be applied to the content object, applying the operation to the content object and replicating the operation to the object based on the one or more permissions defined in the data structure for applying an operation to the content object or the object and allowing the object to be communicated to the remote computing device participating in the second communication session, wherein the operation applied to the content object is further applied to at least one associated object based on the one or more permissions defined in the data structure allowing the object to be graphically moved with the content object; and in response to detecting that the operation is to be applied to the object, applying the operation to the object and replicating the operation to the content object based on the one or more permissions defined in the data structure for applying an operation to the content object or the object and allowing the content object to be communicated to the remote computing device participating in the second communication session, wherein the operation applied to the object is further applied to at least one associated content object based on the one or more permissions defined in the data structure allowing the content object to be graphically moved with the object.

9. The method of claim 8, wherein the input indicates that the operation further comprises a movement of the object to a new position within a three-dimensional environment, and wherein applying the operation to the object and replicating the operation to the content object comprises:

moving a rendering of the object to the new position in response to the input; and repositioning a rendering of the content object to track the movement of the object, wherein repositioning of the content object maintains a graphical association between the content object and the object defined in the data structure.

10. The method of claim 8, wherein the one or more permissions are configured to allow or deny individual users from moving the content object, wherein repositioning the rendering of the content object is denied or allowed based on the permissions.

11. The method of claim 8, wherein the input indicates that the operation further comprises a movement of the content object to a new position within a three-dimensional environment, wherein applying the operation to the content object and replicating the operation to the object comprises:
moving a rendering of the content object to the new position in response to the input;
repositioning a rendering of the object to track the movement of the content object, wherein repositioning of the object maintains a graphical association between the content object and the object defined in the data structure.

12. The method of claim 11, wherein the one or more permissions are configured to allow or deny individual users from moving the object, wherein repositioning the rendering of the object is denied or allowed based on the permissions.

13. The method of claim 8, wherein the data structure defines permissions for the object, wherein the communication comprises causing a transmission of model data defining the object to the remote computing device in response to determining that the permissions indicate a user associated with the input has permissions to access the model data defining the object.

14. The method of claim 8, wherein the method further comprises:
analyzing streams between a plurality of computers of a second communication session;
determining that at least one stream comprises at least one reference to the object or the content object, wherein the operation comprises instructions for sending the content object and the object to the remote computing device in response to determining that the at least one stream comprises the at least one reference to the object or the content object.

15. The method of claim 10, wherein allowing or denying the individual user from moving the content object further allows or denies the user from moving at least one associated object.

16. A method for creating and tracking associations between a content object and an object, comprising:
receiving input data indicating a position for the content object to be displayed in association with the object rendered on one or more computing devices of a communication session;
generating a data structure defining the association between the content object and the object, the position of the content object and a position of the object, characteristics of the object content and characteristics of the object, and one or more permissions for applying an operation to the content object or the object;
detecting an input indicating the operation to graphically move the content object or the object;
in response to detecting that the operation is to be applied to the content object, applying the operation to the content object and replicating the operation to the object based on the one or more permissions defined in the data structure allowing the object to be graphically moved with the content object, wherein the operation applied to the content object is further applied to at least one associated object based on the one or more permissions defined in the data structure allowing the object to be graphically moved with the content object; and
in response to detecting that the operation is to be applied to the object, applying the operation to the object and replicating the operation to the content object based on the one or more permissions defined in the data structure allowing the content object to be graphically moved with the object, wherein the operation applied to the object is further applied to at least one associated content object based on the one or more permissions defined in the data structure allowing the content object to be graphically moved with the object.

17. The method of claim 16, wherein the operation further comprises instructions for sending the object to a remote computing device of a second communication session, wherein applying the operation to the object and replicating the operation to the content object comprises:
communicate model data defining the object to the remote computing device; and
communicate model data defining the content object to the remote computing device in response to verifying the association defined in the data structure, wherein the data structure provides computing devices of the second communication session access to the object and the content object.

18. The method of claim 16, wherein the data structure defines a plurality of content objects and permissions for individual content objects of the plurality of objects, wherein the communication of the model data defining the content object is based on the permissions associated with content object.

19. The method of claim 16, wherein the operation further comprises instructions for sending the content object to a remote computing device of a second communication session, wherein applying the operation to the content object and replicating the operation to the object comprises:
communicate model data defining the content object to the remote computing device; and
communicate model data defining the object to the remote computing device in response to verifying the association defined in the data structure, wherein the data structure provides computing devices of the second communication session access to the object and the content object.

20. The method of claim 16, further comprising:
analyzing streams between a plurality of computers of a second communication session;
determining that at least one stream comprises at least one reference to the object or the content object, wherein the operation comprises instructions for sending the content object and the object to the remote computing device in response to determining that the at least one stream comprises the at least one reference to the object or the content object.

* * * * *